United States Patent [19]

Vincent

[11] Patent Number: 5,144,498
[45] Date of Patent: Sep. 1, 1992

[54] VARIABLE WAVELENGTH LIGHT FILTER AND SENSOR SYSTEM

[75] Inventor: Kent D. Vincent, Cupertino, Calif.

[73] Assignee: Hewlett-Packard Company, Palo Alto, Calif.

[21] Appl. No.: 480,172

[22] Filed: Feb. 14, 1990

[51] Int. Cl.$^5$ .............................................. G02B 5/20
[52] U.S. Cl. .................................. 359/885; 359/890; 359/722; 359/359; 250/226; 356/320
[58] Field of Search ............... 359/885, 887, 890, 350, 359/359, 618, 722, 723; 356/300, 320, 331, 332, 51, 303, 346, 345, 328; 250/226

[56] References Cited

U.S. PATENT DOCUMENTS

| | | |
|---|---|---|
| 2,749,792 | 6/1956 | Kelly . |
| 2,960,015 | 11/1960 | Rodine ........................ 95/1 |
| 3,387,531 | 6/1968 | Hesse ........................ 88/14 |
| 3,442,572 | 5/1969 | Illsley et al. ........................ 359/589 |
| 3,498,693 | 3/1970 | Fein et al. ........................ 359/589 |
| 3,552,826 | 1/1971 | Hanes et al. ........................ 359/589 |
| 3,635,562 | 1/1972 | Catherin ........................ 356/112 |
| 3,659,918 | 5/1972 | Tan . |
| 3,929,398 | 12/1975 | Bates ........................ 356/186 |
| 4,253,765 | 3/1981 | Kato et al. ........................ 356/328 |
| 4,264,211 | 4/1981 | Biggs ........................ 352/432 |
| 4,318,616 | 3/1982 | Chamran et al. ........................ 356/332 |
| 4,320,971 | 3/1982 | Hashimoto et al. ........................ 356/328 |
| 4,547,074 | 10/1985 | Hinoda et al. ........................ 356/405 |
| 4,566,797 | 1/1986 | Kaffka et al. ........................ 356/402 |
| 4,572,669 | 2/1986 | James et al. ........................ 356/352 |
| 4,709,144 | 11/1987 | Vincent ........................ 250/226 |
| 4,718,764 | 1/1988 | Fink ........................ 356/328 |
| 4,731,881 | 3/1988 | Geller ........................ 455/619 |
| 4,738,527 | 4/1988 | McBrien ........................ 356/5 |
| 4,740,082 | 4/1988 | Young ........................ 356/346 |
| 4,743,114 | 5/1988 | Crane ........................ 356/346 |
| 4,746,793 | 5/1988 | Hopkins, II ........................ 250/237 |
| 4,764,670 | 8/1988 | Pace et al. ........................ 250/226 |
| 4,776,696 | 10/1988 | Hettrick et al. ........................ 356/328 |
| 4,795,256 | 1/1989 | Krause et al. ........................ 356/320 |
| 4,797,000 | 1/1989 | Curtis ........................ 356/436 |
| 4,806,750 | 2/1989 | Vincent ........................ 250/226 |
| 4,822,998 | 4/1989 | Yokota et al. ........................ 250/226 |
| 4,825,262 | 4/1989 | Mallinson ........................ 356/352 |

Primary Examiner—Loha Ben

[57] ABSTRACT

Light filter apparatus for receiving a light beam having wavelengths in a selected band and for dispersing the light into a plurality of rays, with each ray having a different wavelength for which the intensity peaks. The peak wavelength varies approximately continuously with displacement of spatial position in a chosen direction along the filter's light-receiving plane. In one embodiment, the filter is a modified etalon structure having at least two reflecting surfaces whose separation distance is not constant but increases or decreases monotonically with distance in a chosen direction in a light-receiving plane of the etalon. Each of these two reflecting surfaces may be planar or non-planar but continuous, or may have a step or staircase configuration. This structure may operate using transmitted light or reflected light. In a second embodiment, an edge filter combination is used to produce a narrow band of transmitted or reflected light having a variable central wavelength that varies with position along the chosen direction. In a third embodiment, a multi-layer thin film structure is used to provide a narrow band of transmitted or reflected light having a variable central wavelength. The filter may be combined with a one-dimensional or two-dimensional array of photosensor elements, which array may be linear, circular or generally curvilinear, one such element receiving a group of adjacent light rays of similar peak wavelength, to provide a plurality of different wavelength readings on an incident light beam for spectrophotometry or colorimetry analysis.

84 Claims, 15 Drawing Sheets

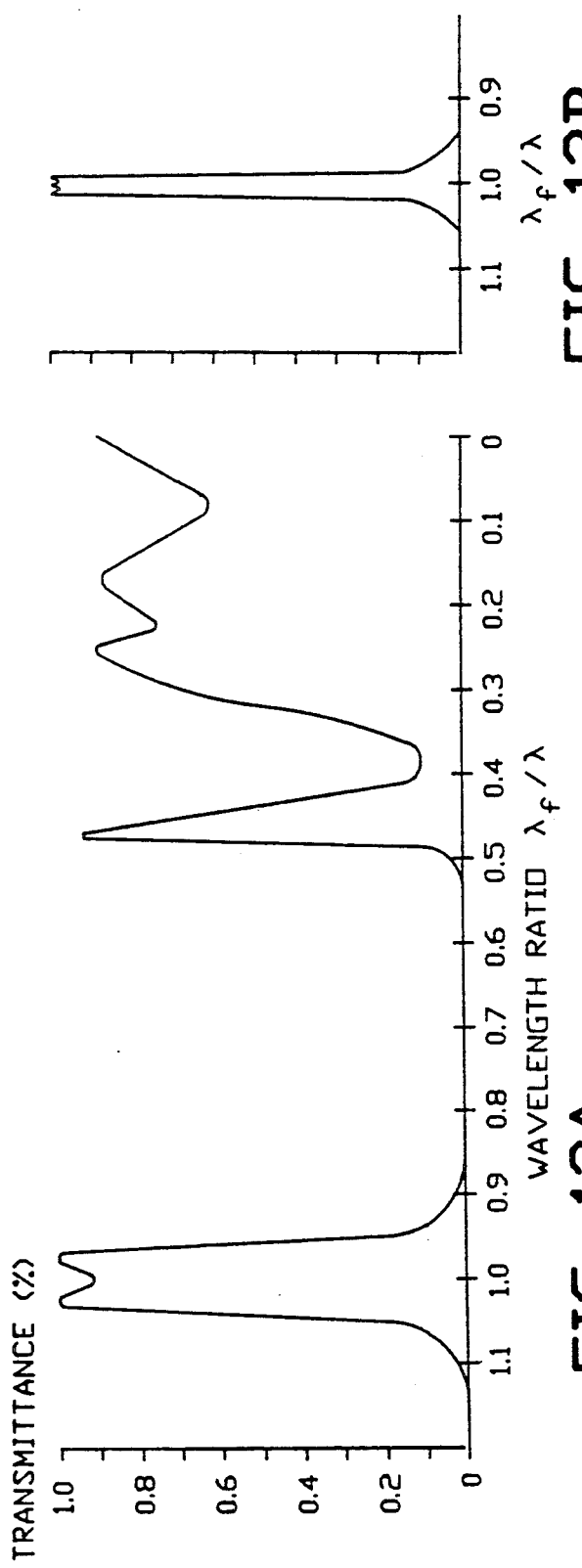
FIG.-13A
FIG.-13B
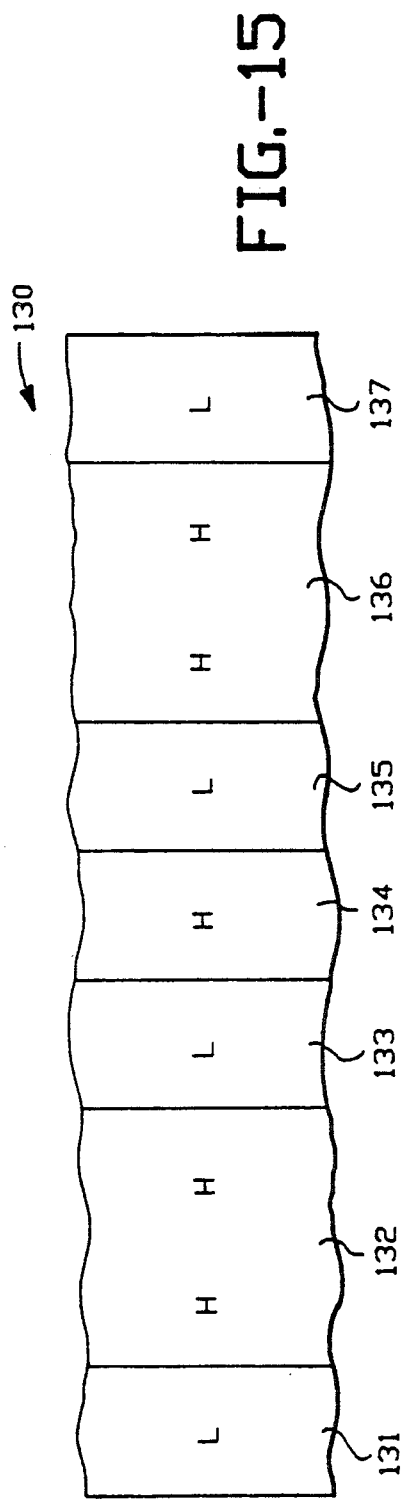
FIG.-15

VARIABLE WAVELENGTH LIGHT FILTER AND SENSOR SYSTEM

FIELD OF THE INVENTION

This invention relates to spectrophotometers, radiometers, photometers and colorimeters and means for dispersing and analyzing the wavelengths of light received in an incident light beam, and to wavelength band filters therefor with variable wavelength pass bands.

BACKGROUND OF THE INVENTION

In using a spectrophotometer, it is usually necessary to disperse the incident light beam into a plurality of different wavelengths or wavelength intervals in order to fully analyze the content of the incident light beam. One means of such dispersion is disclosed in U.S. Pat. No. 4,678,332, issued to Rock et al., in which a fiberoptics reformatter having a plurality of fibers is used for dispersion of the incident beam into its component wavelengths.

Another means of wavelength dispersion is disclosed in U.S. Pat. No. 4,681,445, issued to Perkins, in which a plurality of beam splitters, each functioning in a different part of the wavelength spectrum, is used to provide wavelength dispersion of an incident light beam. Crane, in U.S. Pat. No. 4,743,114, discloses the use of Fabry-Perot interferometer scanning using a nutating etalon in which the incidence angle of the light beam relative to the interferometer is caused to vary periodically in two perpendicular directions of rotation.

Use of a blazed diffraction grating or similar means of wavelength dispersion is disclosed in U.S. Pat. No. 4,758,090, issued to Schuma, and in U.S. Pat. No. 4,718,764, issued to Fink, and in U.S. Pat. No. 4,776,696, issued to Hettrick et al. In U.S. Pat. No. 4,731,881, Geller discloses means for blocking all light of the incident beam except a narrow pass band of wavelengths whose wavelength versus intensity content is then analyzed.

FIG. 1 illustrates a simple Fabry-Perot etalon 11, used as a narrow band pass filter in the prior art. An incident wave 12 arrives at a first surface 13 of the etalon that is partly reflecting and partly transmitting. A transmitted portion 14 of the light beam passes through the first reflecting surface 13 and propagates to a second parallel surface 15 that is partly reflecting and partly transmitting. The transmitted portion 14 of the light beam 12 is reflected back and forth between the reflecting surfaces 13 and 15 many times, with a portion of this light being transmitted through the second reflecting surface 15 at each pass. This produces a transmitted light beam 16 whose amplitude manifests well-known interference effects associated with the etalon 11 and depending upon the (constant) distance of separation h between the two reflecting planes 13 and 15. In this simplest approach to the Fabry-Perot etalon, the thickness of the reflecting surfaces 13 and 15 is ignored so that the only interference effect comes from the distance of separation of the surfaces 13 and 15. The distance of separation h is normally chosen to be $\lambda \sec \Theta / 2n$, where n is the refractive index of the material between the two reflecting surfaces 13 and 15 and $\Theta$ is the incidence angle of the light received at the first reflecting surface.

Another narrow band pass filter discussed in the prior art is a thin film edge filter, which consists of a thin film of material that has a transition edge at a predetermined range of wavelengths $\lambda = \lambda_0$, is substantially fully transparent for wavelengths $\lambda > \lambda_0$ and is substantially reflective for a continuous band of wavelengths $\lambda < \lambda_0$. This filter is discussed by H.A. McLeod in *Thin-Film Optical Filters*, MacMillan, 1986, pp. 188–233, incorporated by reference herein, and one embodiment 17 is illustrated in FIG. 2. In FIG. 2, a first sequence of identical thin films 19 of quarter wave thickness $\lambda/4n_H$ of material 25 of high refractive index $n_H$ alternates with a second sequence of identical thin films 21 of quarter wave thickness $\lambda/4n_L$ of material of lower refractive index $n_L$. An incident light beam 22 having a plurality of wavelengths approaches the edge filter 17, and after the beam is reflected and transmitted at various interfaces of the filter, a light beam 23 emerges from the filter 17 with long wavelength components $\lambda > \lambda_0$ attenuated minimally, with wavelength components in a range $\lambda_1 < \lambda < \lambda_0$ attenuated (by reflection, or alternatively by transmission) almost completely, and with shorter wavelength components $\lambda < \lambda_1$ attenuated moderately or not at all. For a choice of germanium ($n_H = 4.0$) and silicon monoxide ($n_L = 1.70$) as the thin film materials (13 layers each) and a reference wavelength $\lambda_0 = 4.0$ $\mu$m, the computed optical transmittance exhibits a totally reflective band between $\lambda = 3.3$ $\mu$m and $\lambda = 5.4$ $\mu$m, as illustrated by McLeod, op.cit., in FIG. 6.2 on page 190. The configuration of FIG. 2 may also be used as a multilayer thin film to provide a filter that is highly transmissive or highly reflective in a specified wavelength band. Other suitable choices of filter material include quartz ($n_L = 1.45$), MgF$_2$ ($n_L = 1.38$), Na$_3$AlF$_6$ ($n_L = 1.35$), PbCl$_2$ ($n_H = 2.20$) and ZnS ($n_H = 2.35$).

In a more sophisticated approach, the thickness of one of the reflecting surfaces 13 and 15 in FIG. 1 might also be taken into account so that additional interference effects arise from reflections at the two spaced-apart boundary surfaces of the reflecting surface that has non-zero thickness. This leads to consideration of a compound Fabry-Perot etalon that has two sets of reflecting surfaces and, usually, different distances of separation between each of the pairs of reflecting surfaces. The compound Fabry-Perot interferometer is discussed briefly in E.U. Condon and H. Odishaw, *Handbook of Physics*, McGraw-Hill, 1967, pp. 6–100 to 6–102 and in F.A. Jenkins and H.E. White, *Fundamentals of Optics*, McGraw-Hill, 1976, pp. 301–303.

At the same time, it may be desirable to alter the intensity distribution of light received at one or more detectors associated with the spectrophotometer or colorimeter to compensate for other processes. Young, in U.S. Pat. No. 4,740,082, discloses a spectrophotometer in which a photosensitive detector is uniformly illuminated for all areas of an aperture through which a portion of the light beam passes. In U.S. Pat. No. 4,264,211, Biggs discloses a light sensor in which the incident radiation received is corrected by the cosine law that applies to radiation received at a non-zero incidence angle by a radiation conductor.

A variable color filter is disclosed by Illsley et al. in U.S. Pat. No. 3,442,572, using a wavelength filter positioned on the circumference of a large circle, where the filter thickness increases linearly with increase of the azimuthal angle $\Theta$ ($0 < \Theta < 2\pi$) of the position on the circle circumference. This invention relies on a fabrication method and apparatus, disclosed and claimed in two division U.S. Pat. Nos. 3,530,824 and 3,617,331, that probably cannot be used to fabricate a filter whose thickness is not linearly increasing with increase in a spatial coordinate. Rodine, in U.S. Pat. No. 2,960,015, discloses another method of making variable transmission light filters in a two-dimensional, radially symmetric configuration in which filter transmissivity varies with radial distance from the center of a circular pattern.

Kato et al., in U.S. Pat. No. 4,253,765, disclose a multi-wavelength spectrophotometer that explicitly takes account of the decrease in sensitivity of most detectors at the lower end of the visible range of wavelengths by dividing this range into sub-ranges, each of which is scanned over different integration times. Kato et al. use a diffraction grating to provide the division of incident light into wavelength sub-ranges.

In U.S. Pat. No. 4,566,797, Kaffka et al. disclose use of a plurality of narrow band radiation emitting diodes, each of which emits almost-monochromatic light with differing central wavelengths. This provides a small, finite number of discrete wavelengths for use with a spectrophotometer, and these wavelengths cannot be varied or used to provide a continuous range of wavelengths.

Hopkins, in U.S. Pat. No. 4,746,793, disclose use of a mask to shade one or more of a plurality of photodiodes from light of undesired frequencies, in order to avoid overloading a photodiode by receipt of intense light produced by a strong spectral band in the light source. Light corresponding to the intense portion of the spectrum produced by the light source is masked off, and light from the remaining wavelength components is received in a normal manner for use in a spectrophotometer.

A two-dimensional color filter array, using red, green and blue filters in a predetermined pattern, is disclosed in U.S. Pat. No. 4,764,670, issued to Pace et al. The filter dyes are effectively positioned directly on the light sensors, and each dye is unavoidably broad band. This arrangement would not be suitable for spectrophotometry because it cannot provide a variable set of narrow wavelength bands.

U.S. Pat. No. 4,795,256, issued to Krause et al., discloses use of a first beam splitter to produce a first monochromatic light beam and a second beam splitter to produce a second monochromatic light beam, with a different central wavelength, from the remainder of the light beam. Although one could continue this to produce a small number of different wavelength light beams, the overall apparatus would be complex and large and would produce only a discrete set of fixed wavelengths, not a continuously variable set of such wavelengths.

U.S. Pat. No. 4,797,000, issued to Curtis, discloses a comparative colorimeter that compares the color densities of two liquid samples and provides a measure of the degree of difference of the two samples. The apparatus uses a differential amplifier circuit that receives electrical signals produced by receipt of light transmitted through each of the samples at a pair of photodetectors. The currents produced at the photodetectors are preferably logarithmically converted to voltage signals in order to increase the dynamic range of the apparatus. The photodetector sensors appear to use conventional discrete filter-diffuser combinations to analyze the transmitted light in each of a small number of wavelength subranges.

Several U.S. patents disclose use of a Fabry-Perot interferometer arrangement in which one of the two parallel reflecting surfaces thereof can be displaced by a controllable amount in order to vary the distance between the two reflecting surfaces and thereby vary the wavelength(s) at which maximum transmission occurs from the interferometer. These patents include U.S. Pat. No. 3,387,531 issued to Hesse, U.S. Pat. No. 3,635,562 issued to Catherin, U.S. Pat. No. 4,318,616 issued to Chamran et al., U.S. Pat. No. 4,572,669 issued to James et al., U.S. Pat. No. 4,738,527 issued to McBrien, and U.S. Pat. No. 4,825,262 issued to Mallinson.

Fein et al. disclose an optical radiation translating device in U.S. Pat. No. 3,498,693. The Fein et al. apparatus in one embodiment (FIG. 3) uses two spaced apart planar reflectors of light that are inclined at a non-zero angle relative to one another, with a wedge-shaped dielectric material occupying the volume between the reflectors. Light is transmitted through the wedge-shaped filter, requiring constructive interference of the light waves, only at positions along the device where the one-way optical path length of the light beam through the dielectric material is an integral multiple of one half the wavelength $\lambda_0$ of the light, which is assumed to be monochromatic. The dielectric spacer material has an electrical field applied thereto, and as the magnitude of the voltage changes the positions where light beam transmissions occur are moved across the face of the device. In all embodiments discussed, the light beam is monochromatic and the number of discrete light transmission positions along the filter is finite and is equal to the number of discrete positions where the optical path length through the dielectric material is $m \lambda_0/2$ ($m = 1,2,3, \ldots$). Light transmission through the device will be manifested by the appearance of one or a discrete sequence of uniformly spaced light beam spikes at intervals along the face of the device.

In U.S. Pat. No. 3,552,826, Hanes et al. disclose a variable thickness, multi-layer light reflector with a thickness $h(x)$ that decreases exponentially with increase in a spatial coordinate x, measured in a predetermined direction in a plane of the reflector. The reflectance R of the reflector at any point x is a function of the single variable $w = \lambda/h(x)$, where $\lambda$ is the wavelength of light incident on the reflector. The exponential decrease of thickness $h(x)$ with the coordinate x is required in order to insure that $\partial^2 R/\partial \lambda \partial x = 0$ and $\partial^2 R/\partial x^2 = 0$.

Bates, in U.S. Pat. No. 3,929,398, also discloses use of a wedge-shaped interference filter to produce a line of light at a particular coordinate position x that varies with the wavelength of the incident monochromatic light. The position x of the line of light is variable and is controlled by the operator's choice of wavelength. A sequence of masks is used to selectively mask portions of the line to produce an ordered sequence of dark and light regions on the illuminated line that characterizes the light (e.g., its wavelength).

A color sensing device using a group of adjacent, non-overlapping light filters with different pass bands is disclosed by Hinoda et al. in U.S. Pat. No. 4,547,074. Each light filter consists of an interference filter with a plurality of separated wavelength pass bands plus a color filter with a sharp cutoff band that falls within one of the interference filter pass bands. The serial combination of these two filters selects a particular, fixed narrow wavelength band for transmission of light therethrough. A photodiode, positioned beneath the serially combined interference filter and color filter, receives the transmitted light and determines the relative intensities of light in each of several wavelength pass bands. Photodiode light-receiving faces may have different areas to reflect the light sensitivity of the photodiodes in different, fixed wavelength regions. A subgroup of such filters may be configured to sense the relative amount of light in each of a set of adjacent wavelength bands, to thereby provide color matching capability according to the CIE XYZ colorimetric system. The incident light is not assumed to be monochromatic, but it appears that each interference filter/color filter pair must be carefully matched to provide a narrow, fixed wavelength pass band.

U.S. Pat. No. 4,822,998, issued to Yokota et al., discloses use of an array of light sensors, each sensor being sensitive to a different wavelength range and receiving light transmitted through a light filter with a transmission wavelength band pass corresponding to the wavelength band to which the light sensor responds. In one embodiment, shown in FIG. 1 of the Yokota et al. patent, the light filter array is arranged in a double staircase configuration, with the filter thickness increasing from one plateau of constant thickness to another plateau of greater constant thickness. A first filter staircase and second filter staircase have filter thicknesses chosen to correspond to optical interference orders m=1 and m=2, respectively, according to well known optical interference relations for a Fabry-Perot etalon. 0.7 μm) into two smaller wavelength ranges, the sidebands of each interference order, other than the order m=1 or m=2 that is desired, are caused to appear at wavelengths well removed from the visible spectrum and can be attenuated with simple fixed band pass ultraviolet and/or infrared filters. Low order Fabry-Perot interference bands are usually not narrow enough by themselves for most spectrophotometer applications. As FIG. 7 of the Yokota et al. patent illustrates, the full width at half maximum ("FWHM") for a low order interference band, with a central wavelength $\lambda_c=400$ nm, is 15 nm and 9.6 nm for surface reflectivities of R=0.23 and 0.62, respectively. The FWHM would increase with increasing wavelength. These FWHM values are much too wide for many applications of such technology in colorimeters and radiometers. Increasing the reflectivity R of the surfaces of the Fabry-Perot etalon will narrow the FWHM by a modest amount, but the FWHM is still too large for some spectrophotometer applications, and the transmissivity $T=1-R$ may already be so low that the signal-noise ratio for the photosensor signals becomes a concern. The wavelength skirts that extend beyond the FWHM wavelength region may also be too broad to allow sharp wavelength discrimination.

Many of the devices of the prior art are large and bulky and do not make full use of or analyze all wavelengths in a continuous wavelength interval of the incident light beam. The cost of these devices is usually great, due in part to the delicate optical systems used. Further, no controllable means has been disclosed for compensating, at the same time, for the non-uniform sensitivity, as a function of wavelength, of photodetector elements or for compensating for use of a non-standard light source for illumination.

What is needed is a compact apparatus that (1) efficiently disperses a light beam into a continuous interval of wavelengths and analyzes the content of the light beam throughout this interval; (2) allows shifting or augmentation of the wavelength interval to be analyzed; (3) allows flexibility in alteration of the light beam intensity distribution received by a plurality of wavelength-sensitive photodetector elements; (4) provides sharply defined, very narrow bands of light of different wavelengths at each photodetector element; and (5) allows construction of the apparatus on a single chip that is compact and rugged and has low cost.

SUMMARY OF THE INVENTION

These needs are met by providing the combination of a wavelength filter having a bandpass peak wavelength that varies continuously with displacement of spatial position on the filter plus a photosensor array positioned to detect selected wavelengths passed by the filter. A pair, or series of pairs, of reflecting surfaces, spaced apart by a distance that varies with position, serves as a variable wavelength filter. The optical path length from one reflection surface to another varies with position in a selected spatial direction along the light-receiving plane of the filter. This permits shifting of the central wavelength and surrounding wavelength pass band interval while allowing alteration of beam intensity distribution at photodetector elements. At any position on the filter where the filter is to promote or accentuate transmission or reflection of light of a particular central wavelength $\lambda_c$, the filter layer thickness should be $(m-\frac{1}{2})\lambda_c/2n$ or $m\lambda_c/2n$ ($m=1,2,3,\ldots$), depending upon the configuration, where n is the real part of the refractive index of the filter material. Where reflection of light at a given wavelength $\lambda$ is to be promoted, the filter thickness should be $(2m-1)\lambda\sec\eta/4n$, where $\Theta$ is the incidence angle of the light beam.

In one embodiment, the invention includes a stratum of material that is at least partly transmitting and has a thickness that increases monotonically in a selected spatial direction, where the perpendicular thickness at some position of the single stratum is equal to $m\lambda_{co}/2n$ (transmission mode) or $(m-\frac{1}{2})\lambda_{co}/2n$ (reflection mode), where m is a positive integer, $\lambda_{co}$ is a particular central wavelength in a selected band of central wavelengths $\lambda_c$, and n is the real part of the refractive index of the material. This embodiment also includes an array of photosensors positioned adjacent to the filter layer to receive light transmitted through or reflected from the filter layer at various positions in the selected direction. An example of such a filter stratum would be a wedge of material bounded partly by two planar reflecting surfaces that make a very small angle with one another. Optionally, at least one of the light-receiving surfaces of this stratum has a filter layer deposited on or adjacent to the surface to suppress the appearance in the output signal of any undesired side bands. A "side band," as used herein, is a pass band that does not include the desired central wavelength. The wedge or shaped stratum of filter material functions as a modified etalon with a thickness or distance between the reflecting surfaces that varies with position. Transmitted light or reflected light may be used from this filter. This is also true for the other embodiments discussed below.

In a second embodiment, the invention includes a first narrow band pass filter with monotonically increasing thickness in a selected spatial direction and a second broad band pass filter. Each of the two filters may independently operate in the transmission mode or in the reflection mode, whereby a light beam issued by one of the filters is received by the other filter. The broad band pass filter optionally has a monotonically increasing thickness in the selected spatial direction so that central wavelengths $\lambda_c$ of the narrow pass band of the first filter and of the broad pass band of the second filter change with position in the selected direction. The perpendicular thickness of the first filter layer at some position is equal to $m\lambda_c/2n$ (transmission mode) or $(m-\frac{1}{2})\lambda_c/2n$ (reflection mode), where m is a positive integer, n is the real part of the refractive index of the first layer material, and $\lambda_c$ is a central wavelength in the narrow pass band of the first filter at that position. An array of photosensors may optionally be positioned to receive a portion of a light beam that has been transmitted through or reflected from each of the first filter and the second filter at a selected position on each filter.

The filters in each of the embodiments may be formed as Fabry-Perot etalons, as edge filters, as multilayer thin films, or as any similar optical filter devices in which a central wavelength of an optical pass band can vary with position.

A third embodiment provides a first reflecting surface of approximately constant thickness and a second reflecting surface arranged in a staircase configuration having a plurality of two or more planar staircase segments, each staircase segment having approximately constant thickness and being approximately parallel to the first surface, with a layer of filter material being provided in the volume between the first and second reflecting surfaces. The distances of separation between the first surface and each of the staircase segments of the second surface increases (or decreases) monotonically in a selected spatial direction but need not increase (or decrease) by a constant increment. Any of these embodiments can be used in a transmission mode or in a reflection mode.

In a fourth embodiment, two edge filters, one high pass and one low pass, are provided in series in the path of an incident light beam to produce a resulting light beam with a narrow band of wavelengths surrounding a central wavelength $\lambda_c$, where $\lambda_c$ varies with a spatial coordinate x measured along a selected spatial direction on the combination filter. The wavelength $\lambda_c$ is caused to vary with position x by varying the thickness of one or more layers of optically refracting material that comprise each of the two edge filters.

In a fifth embodiment a multi-layer thin film is provided having at least one layer with monotonically increasing (or decreasing) thickness, with a narrow pass band having a central wavelength $\lambda_c$ that varies with position.

The filter apparatus may be incorporated in a spectrophotometer apparatus that includes the filter and an array of photosensors extending in the selected direction and being positioned to receive portions of a light beam that is transmitted through the filter. This array of photosensors receives a portion of a light beam corresponding to a continuous interval of wavelengths in the incident light beam. The spectrophotometer apparatus may include a plurality of two or more such filters, each filter having a corresponding photosensor array or segment of a common array to receive light transmitted at various positions through the filter apparatus, plus electronic circuitry for stitching together the wavelength ranges of the different photosensor arrays. In this manner, a plurality of overlapping or non-overlapping wavelength intervals may be analyzed by the spectrophotometer apparatus. The apparatus may also include light distribution means for receiving the incident light beam and for altering the light intensity spatial distribution of the light that would otherwise be received at the first light-receiving surface of the filter.

The spectrophotometer filter and associated photosensor apparatus may be incorporated on one or more compact chips so that the device is compact enough to be used in a variety of medical, environmental and other situations in which analysis of the wavelength spectrum of the incoming light is required. The apparatus may, for example, be used in colorimetry, for determining the characteristics of a particular color or its "closeness" to another color, for monitoring the color signals displayed on a color printer, computer monitor or television screen, or for monitoring the changes in color displayed due to changes in local environmental conditions. The apparatus may also be used in photometry to determine the total amount of incident light, or in radiometry to determine the total amount of incident light in a restricted frequency range such as the microwave region. The apparatus may also be used as a multiple channel communications receiver, as a color scanner, or as a monochromator. Apparatus for most of these applications may be made small enough to be portable or usable as hand-held apparatus.

BRIEF DESCRIPTION OF THE DRAWINGS

FIGS. 13A and 13B are plots of transmittance versus inverse wavelength for two thin film filters implemented according to the invention.

FIG. 15 is a cross-sectional view of another multilayer thin film filter constructed according to the invention.

BEST MODE FOR CARRYING OUT THE INVENTION

Figure 3:
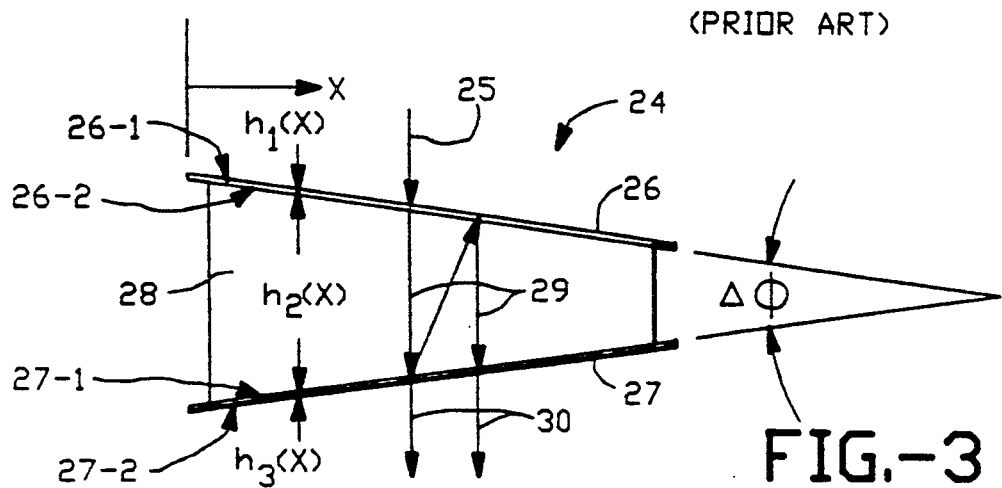
FIG. 3 is a side view of one embodiment (transmission mode) of the filter invention in which the distance of separation of two reflecting planes increases monotonically with a spatial coordinate x.

With reference to FIG. 3, showing one embodiment of a filter 24 of the invention, a light beam 25 arrives at a first reflecting surface or layer 26 of material having thickness h(x), which may be variable but is preferably constant. The word "light" here is taken to refer to any portion of the electromagnetic spectrum. The word "stratum" here refers to a material with at least one light receiving surface, which can be a bare surface or a surface with a filter layer deposited on it. The first reflecting surface 26 is spaced apart from and faces a second reflecting surface or layer 27 having a thickness $h_3(x)$. If the reflecting surface 26 or 27 has no separate layer deposited on it, $h_1(x)=0$ or $h_3(x)=0$, respectively. The two reflecting surfaces or layers 26 and 27 are separated by a spacer stratum 28, and the distance of separation $h_2(x)$ between the two reflecting surfaces or layers 26 and 27 varies with a spatial coordinate x measured in a selected direction along a light receiving plane of the first reflecting surface or layer 26. The spacer stratum 28 may be air or a vacuum and the reflecting layers 26 and 27 may be mechanically self-supporting, or the stratum 28 may be another optical medium, as discussed below.

In one embodiment, the two reflecting surfaces or layers 26 and 27 are planar and make a very small angle $\Delta\Phi$ with one another as shown, where this angle is generally of the order of milliradians. This produces a wedge-shaped spacer stratum 28. A wedge-shaped stratum 28 may be made by deposition on a substrate, using a moving mask to vary the thickness of the layer along a given direction. A portion of the incident light beam 25 is transmitted through the first reflecting surface 26 and becomes a plurality of first transmitted beams 29 through multiple reflections within the spacer stratum 28. A portion of each of the plurality of first transmitted beams 29 is further transmitted through the second reflecting surface 27 and becomes one or a plurality of second transmitted beams 30 that issue from the filter 24 in the transmission direction.

Assume that the incident light beam 25 has a light beam component having a wavelength $\lambda_c$ within a selected continuous band of wavelengths. If the reflecting layers 26 and 27 are metallic, the thicknesses $h_1$ and $h_3$ of the metal layers would be chosen to produce predetermined reflection coefficients in the wavelength band of interest. Alternatively, one or both of the layers 26 and 27 may be a stack of thin films with at least two different materials, one having a high refractive index and one having a low refractive index, where the high index and low index materials alternate with one another in a well known manner. In this instance, the layer 26 has first and second light-receiving surfaces 26-1 and 26-2, spaced apart from and facing one another, and/or the layer 27 has first and second light-receiving surfaces 27-1 and 27-2, spaced apart from and facing one another, as shown in FIG. 3. The comparative phrase "high refractive index" and "low refractive index" are used relative to one another here. In the visible and near-infrared wavelength regions, a low (high) refractive index material might have an index of refraction $n \leq 1.7$ ($n > 1.7$). In the remainder of the infrared wavelength region, a low (high) refractive index material might have an index of refraction $n \leq 2.5$ ($n > 2.5$).

The variable distance of separation $h_2(x)$ between the two reflecting surfaces or layers 26 and 27 of the stratum 28 preferably is monotonically increasing or monotonically decreasing with increase of the spatial coordinate x and includes at least one position $x_0$ for which $h_2(x_0) = m_2 \lambda_c / 2n_2$, where $m_2$ is a positive integer and $n_2$ is the real part of the refractive index for the spacer material in the spacer stratum 28. Thus, for at least one position $x_0$ along the filter 24 the total optical path length for transmission through the stratum 28 is an integral multiple of the half wavelength $\lambda_c/2$. The incident light may arrive with a small or modest incidence angle relative to the first reflecting layer 26. In practice, this incidence angle is usually chosen to be zero degrees. The spatial coordinate x may be a rectilinear variable such as a Cartesian coordinate, may be an angular variable such as a polar or azimuthal coordinate, or may be any other curvilinear spatial coordinate.

Passage of a light beam through a single wedge-shaped stratum of filter material 28 may produce fringes at nearby wavelengths that are commensurate with the central wavelength for which the system is designed. Optionally, one can include a single filter layer on one of the light-receiving surfaces 26 or 27 (with their own light-receiving surfaces 26-1 and 26-2 or 27-1 and 27-2, respectively) of the stratum 28; or two or more filter layers can be provided at one or both of the light-receiving surfaces 26 and 27 of the stratum 28. These filter layers are chosen to have a relatively narrow wavelength band pass region centered at or near a central wavelength $\lambda_c$ of interest and to filter out by absorption or reflection any incident light at any fringe wavelengths that might otherwise be present in the transmitted beam 30.

A function $h(x)$ is defined to be monotonically increasing in the coordinate x if $h(x_1) \leq h(x_2)$ whenever $x_1 < x_2$. In the embodiments of the invention discussed herein, it is sufficient if the variable distance of separation $h(x)$ of two surfaces increases (or decreases) monotonically with the spatial coordinate x so that intervals of constant separation $h(x)$ may be interspersed with intervals where $h(x)$ increases strictly monotonically with x ($h(x_1) < h(x_2)$ whenever $x_1 < x_2$). One example of a monotonic, but not strictly monotonic, increasing function is the distance $h(x)$ between a reflecting surface 63 and a sequence of staircase step reflecting surfaces 67-q (q=1,2,...) illustrated in FIG. 10, discussed below. An example of a strictly monotonically increasing function is the distance $h(x)$ between the two reflecting surfaces 26 and 27 shown in FIG. 3.

The materials from which the first and second reflecting surfaces 26 and 27 are made should be at least partly transmitting and should absorb at most only a small fraction of the light of wavelength $\lambda_c$ transmitted through that thickness of material. The materials for the first and second reflecting surfaces 26 and 27 and for the spacer stratum 28 may be drawn from glasses, insulators, semiconductor materials such as silicon and germanium, metals such as aluminum, or other materials such as magnesium fluoride, zinc sulfide, calcite, sapphire, and oxides of aluminum, silicon, germanium, calcium, cadmium, titanium, cerium and zirconium. The spacer material for the spacer stratum 28 should be transmitting, with a small or infinitesimal absorption for the light of wavelength $\lambda_c$ and the range of thicknesses $h_2(x)$ used here. The material for the spacer layer may also be vacuum or air, if the layers 26 and 27 serve as reflecting surfaces for the incident light.

Thin film optical filters are well known in the art. They are normally constructed by vacuum deposition of alternating high and low refractive index optic layers on a given substrate, such as glass. Light entering a stack of optically transmitting layers is partially reflected at the boundaries of each layer, with a reflectance amplitude determined by the ratio of the refractive indices across the boundary. A reflection that occurs when a beam approaches a higher refractive index medium from within a lower index medium includes a 180 degree phase shift. A reflection that occurs when a beam approaches lower refractive index medium from within a higher index medium has no phase shift at the boundary. The reflected beams recombine constructively or destructively depending on their phase relationship. By constructing the optical filter with multiple thin layers, each having an optical thickness equal to a quarter wavelength of the incident light or an appropriate multiple thereof, the transmittance or the reflectance of the filter can be made high over a limited range about a central wavelength, and at certain fractional multiples of this wavelength, depending on the ratio of the high and low refractive indices and number of layers.

Outside these spectral zones the reflectance of the multi-layer combination changes abruptly to a low value. The range of reflected wavelengths can be extended by including additional layers of different quarter wavelength thickness, by varying the layer thicknesses, and by maximizing the ratio of refractive indices of successive layers used in the stack. When the filter is constructed of essentially non-absorbing optical materials, wavelengths of light not rejected by reflection are transmitted through the filter, and conversely. Because of this behavior, one can construct thin film optical filters having desired characteristics over a broad wavelength range, including but not limited to short and long wave pass edge filters, narrow and broad band pass filters, and notch filters for both reflection and transmission applications.

Narrow band pass thin film filters are normally constructed using one of two approaches. A first approach combines two edge filters whose transmission ranges or reflection ranges overlap spectrally over a very narrow wavelength band of interest. Sharp edged short wave pass and long wave pass quarter wave plate filter stacks are well suited for producing narrow transmission bands. Here, the phrase "quarter wave plate" means an optically transparent material (with low absorption at the wavelength $\lambda$ of interest) having a multiplicative product of thickness h and refractive index $n(\lambda)$ that satisfies $hn(\lambda) = \lambda/4$, $3\lambda/4$, $5\lambda/4$, etc. The phrase "half wave plate" refers to an optically transparent material for which $hn(\lambda) = \lambda/2$, $2\lambda/2$, $3\lambda/2$, etc.

A second approach combines two or more half wave plate spacer strata, each sandwiched between two high reflection (typically greater than 80%) multilayer stacks, to form an interferometer similar to a Fabry-Perot interferometer. Light reflected within the spacer strata undergoes multiple beam interference. Transmission (or reflection) of light incident on the filter becomes extremely high only over a narrow band of wavelengths around that for which a spacer stratum optical thickness is an integer multiple of one half the wavelength of interest. In some instances, reflective metal layers, or combinations of thin film reflective coatings and metal reflectors, are substituted for the pure thin film high reflectance coatings described above.

In each of the above narrow pass band filter approaches, the desired wavelength bandpass is accompanied by higher or lower order fringes and side bands. These undesired bands must be suppressed by additional filtering, usually using combinations of broad band pass thin film filters, absorptive filters or different order Fabry-Perot type filters designed to spectrally overlap only at the desired narrow band pass zone. Normally, the combination of narrow band and broad band attenuation filters will require the coating of one or both sides of one or more substrate plates.

Many materials are suitable for thin film deposition of the light-transmitting layers and have low absorption within specific spectral regions. For the visible and near-infrared spectrum, some of the most common high index coating materials include germanium (refractive index n=4.0), silicon (n=3.2), zinc sulfite (n=2.35), titanium dioxide (n=2.2-2.4), zirconium dioxide (n=2.2), cerium oxide (n=2.2), zinc sulfide (n=2.12) and cadmium oxide (n=2.06). The most common low index coating materials for the visible and near-infrared spectrum include magnesium fluoride (n=1.38), quartz (n=1.45), silicon dioxide (n=1.5) and aluminum oxide (n=1.62). Antimony trioxide and cryolite are typically used as coating materials suited for the 300-400 nm region of the ultraviolet. For the mid- and far-infrared region, germanium (n=4.0) or lead telluride (n=5.5) are good high index materials, and zinc-sulfide (n=2.35) is a good low index material.

There are an unlimited number of combinations of quarter wave and half wave plate layers, and optical materials for producing filters of the varieties already described in treatises such as that of H.A. McLeod, *Thin-Film Optical Filters*, op. cit. This reference is representative of the types and number of designs available in the art.

Continuously variable narrow band pass interference filters, of the type used for the present invention, can be made by varying the thickness of one or more coating layers in the filter stack along a given direction in a plane of the filter stack. In one embodiment, the filter is a wedge defined by two planar layers, so that the center wavelength $\lambda_c$ of the narrow band pass filter will vary approximately linearly along the length or other selected direction of the filter. Each wedged or otherwise variable thickness stratum can be fabricated by moving a mask across the substrate during vacuum deposition of the filter layer on the substrate. The moving mask blocks deposition over areas shadowed by the mask. The desired coating thickness gradient can thus be produced by controlling the ratio of the deposition rate and mask translation rate.

Operation of the invention may be demonstrated with a simple metal reflector Fabry-Perot narrow band etalon. In this instance, a half wave plate optical spacer stratum is positioned between two partially transmitting metallic reflector layers. The transmittance T through the filter at a given wavelength $\lambda$ is given by $$T = (1/(1+(4R/(1-R)^2)(\sin(2\pi n\, h/\lambda))^2)) \quad (1)$$

where R is the reflection coefficient of a metal layer, and $n(\lambda)$ and h are the refractive index and thickness of the spacer stratum, respectively. For a given stratum thickness h, the filter provides a series of transmittance fringes having a bandwidth proportional to the transmittance ($\alpha 1-R$) of the metal layers. For a particular order (m=1,2,3, ...) of transmission pass band, it is seen that the transmittance will remain constant, provided that the ratio of $h/\lambda$ remains constant, assuming $n(\lambda)$ is approximately constant. Stated another way, if the thickness h of the half wave optical stratum changes along a given direction in a plane of the filter, the center wavelength $\lambda_c$ of each order of transmission pass band will change in direct proportion.

Figure 4:
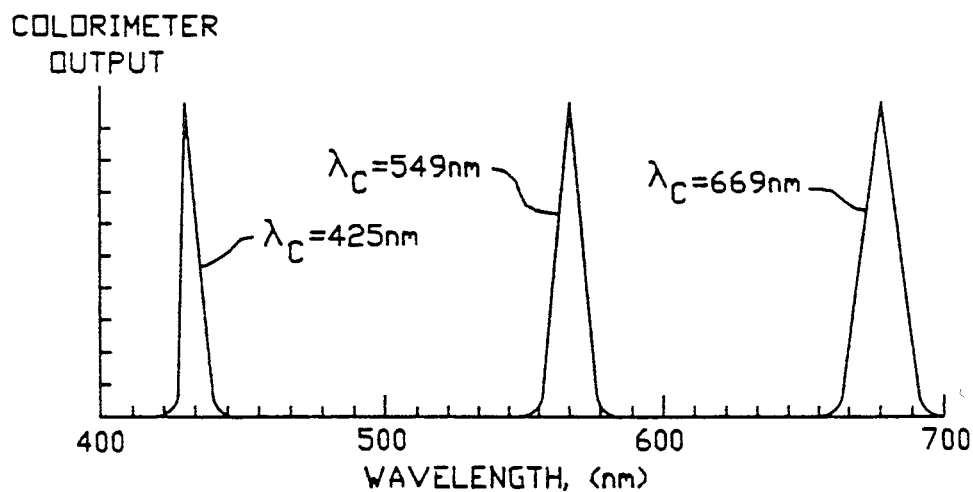
FIG. 4 is a plot illustrating a superposition of three narrow band wavelength regions and the natural broadening that occurs as wavelength increases.

FIG. 4 shows the results of superposition of band pass regions, centered at wavelengths $\lambda_c=425$ nm(x=x$_1$), 549 nm(x=x$_2$) and 669 nm(x=x$_3$), produced by three different filters, or at three different positions on a single variable wavelength filter, using a double cavity, with the aid of the invention. The full widths at half maximum (FWHM) of these three bands are 7.1 nm, 9.2 nm and 11.2 nm, respectively, illustrating the natural broadening that occurs in interference filters as a representative central wavelength $\lambda_c$ increases.

Figure 5:
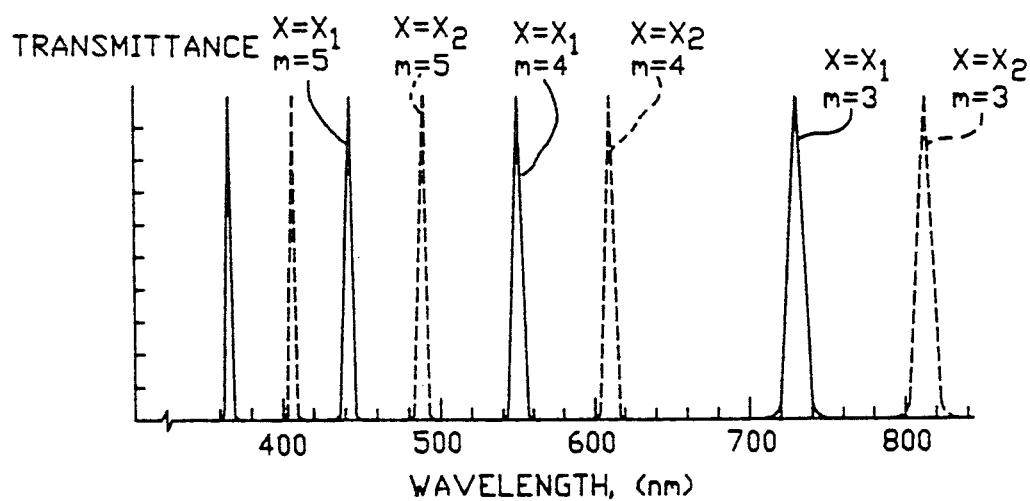
FIG. 5 is a plot of the spectrum of transmitted intensity versus wavelength of light for two positions, $x=x_1$ and $x=x_2$, for the embodiment shown in FIG. 3.

FIG. 5 shows the theoretical transmittance of the second order fringe of a two-cavity Fabry-Perot filter having 85% reflectance metallic layers and having a glass spacer stratum (n=1.52) that varies linearly in physical thickness from about h=400 nm to about h=1000 nm along its length. The third, fourth and fifth order pass band transmittances peak at $\lambda=733$ nm, $\lambda=550$ nm and $\lambda=440$ nm wavelengths at the position of the filter where the half wave physical thickness is h=812 nm, 609 nm and 487 nm, respectively. The solid line transmittance curve and broken line transmittance curve correspond, respectively, to values of the coordinate $x=x_1=0.5L$ and $x=x_2=0.7L$ at the observation point, where L is the length of the filter. Intermediate peaks occur at intermediate wavelength positions between the two ends of the filter.

As mentioned before, a spectrally broad, high reflectance thin film stack can be substituted for the above metallic layers. The technique can be applied to a layer or layers of any of the above thin film filter types, including broad band pass filters, short wave pass edge filters, long wave pass edge filters, and narrow band pass filters, in transmission mode or reflection mode. Usually, a combination of filter types will be required to provide a single narrow band pass with side band or fringe blocking. Variable thickness layers are preferred in the side band blocking layers as well as in the narrow band pass layers so that in-band filtering and out-of-band filtering complement one another along the variable wavelength direction of the filter. However, the side band blocking filter may use a fixed pass band in some situations. Often more than one substrate will be required to accommodate all filter layers, and the substrates will need to be properly aligned.

If one ignores the variation of the stratum separation distance $h_2(x)$ with x and concentrates on a light beam incident on the spacer stratum 28 from above in FIG. 3, the normalized intensity reflection coefficient $I_r$ and the normalized intensity transmission coefficient $I_t$ for the spacer stratum 28 alone become, respectively, $$I_r = \frac{4R\sin^2(\beta/2)}{(1-R)^2 + 4R\sin^2(\beta/2)}, \quad (2)$$

$$I_t = \frac{(1-R)^2}{(1-R)^2 + 4R\sin^2(\beta/2)}, \quad (3)$$

$$\beta = 4\pi n_2 h_2(x) \cos\Theta/\lambda, \quad (4)$$

where $n_2(\lambda)$ is the refractive index of the spacer stratum 28, $\Theta$ is the incidence angle of the light beam, R is the reflection coefficient for the interface between the stratum 28 and the ambient medium. Absorption in the spacer stratum 28 is ignored. This configuration produces a sequence of band pass regions separated by wavelength free spectral ranges of $\Delta\lambda=2nh_2(x)\cos\Theta/m$ (m=1,2,3, ...) that depend upon R and fringe order m. These results are found in M. Born and E. Wolf, *Principles of Optics*, Pergamon Press, Fifth Ed., 1975, pp. 323-329, incorporated herein by reference. Inclusion of the effects of absorption in these equations would produce a small quantitative change in the results. For R<1 and $\Theta=0$, the intensity transmission coefficient It is maximized by the choice $\sin\beta/2=0$ or $$h_2(x)=m(\lambda_c/2n_2)\ (m=1,2,3,\ldots) \quad (5)$$

for light of wavelength $\lambda=\lambda_c$. The intensity reflection coefficient $I_r$ is maximized by the choice $\sin\beta/2=\pm1$ or $$h_2(x)=(m-\tfrac{1}{2})(\lambda_c/n_2)\ (m=1,2,\ldots) \quad (6)$$

Different wavelengths are emphasized for the transmission and for the reflection situations, for fixed wavelength and thickness $h_2(x)$. These relations are true only for a single stratum. For multi-layer thin films, other considerations apply.

The filter apparatus 24 shown in FIG. 3 is not, strictly speaking, a Fabry-Perot etalon because the reflecting planar surfaces or layers 26 and 27 are not quite parallel. Closely spaced groups of rays from the incident light beam will pass through substantially identical thicknesses $h_2$ of the spacer stratum 28 and will not rapidly "walk off" the etalon because of the small angle $\Delta\Phi$ between the planes of the reflecting surfaces 26 and 27.

Two spaced apart groups of rays that are separated by a distance $\Delta x$ in the selected direction of the order of 10 $\mu$m or more may pass through substantially different thicknesses $h_2(x)$ of the spacer stratum 28 and thus may manifest different interference effects. Thus, the portion 30 of the light beam 25 transmitted through the filter 24 in FIG. 3 at two positions $x=x_1$ (unbroken lines in FIG. 5) and $x=x_2$ (dotted lines in FIG. 5) may exhibit peaks of transmitted intensity $I(\lambda;x)$ at different sets of wavelengths, as illustrated in FIG. 5.

Alternatively, if one fixes the incident light beam wavelength $\lambda$ and observes the transmitted intensity $I(\lambda;x)$ as a function of position x along the filter, a graph of this intensity will show a sequence of well separated peaks and intervening valleys. The set of wavelengths for which maxima of transmitted intensity $I(\lambda;x)$ occur will shift approximately continuously, and the magnitudes of these maxima will change approximately continuously, as one varies the position x of observation of the transmitted portion 30 of the beam shown in FIG. 3. Thus, one has in hand a technique for controllably and continuously shifting the peak wavelengths, which technique can be used in spectrophotometric, colorimetric and other applications.

An optical system such as the light filter embodiment 24 shown in FIG. 3 promotes or enhances the intensity of light issuing at a selected fundamental wavelength $\lambda = \lambda_0$ of order $m=1$ and at other fringe wavelengths $\lambda = \lambda_0/m$ (m an integer $\geq 2$). If a higher order fringe is used for the central wavelength ($\lambda_c = \lambda_0/m$ with $m \geq 2$), the rise and fall with respect to wavelength of that fringe signal will be sharper than the corresponding rise and fall for the fundamental ($m=1$), but the center-to-center wavelength difference $\Delta\lambda$ of adjacent and undesirable fringes will be reduced. If, now, a broad band light filter is also provided for which a representative central wavelength is $\lambda_{bb,c} = \lambda_0/m_{bb}$ for the first or second order ($m_{bb}=1$ or 2), the attenuation with respect to wavelength will be less sharp but the fringe or side band wavelengths $\lambda = \lambda_0/m_{bb}$ ($m_{bb} \geq 2$) will be spaced apart much further and their presence may be ignored here. Thus, the serial combination of a narrow band pass light filter operating at a central wavelength $\lambda_c = \lambda_0/m$ ($m \geq 2$) and a broad band light filter operating at a central wavelength $\lambda_{bb,c} = \lambda_0/m_{bb}$ with $m_{bb} = 1$ or 2, will produce a single, sharply attenuated, narrow band filter in which the controlling or central wavelength $\lambda_c$ may be caused to vary by the approaches discussed above.

Preferably, a light filter according to the invention will be provided with both a narrow band filter and a broad band filter. The broad band pass filter may have a fixed broad band pass or may have a variable broad band pass with a central wavelength that is the same as, and changes with, the central wavelength $\lambda_c$ of the narrow band pass filter.

Figure 6:
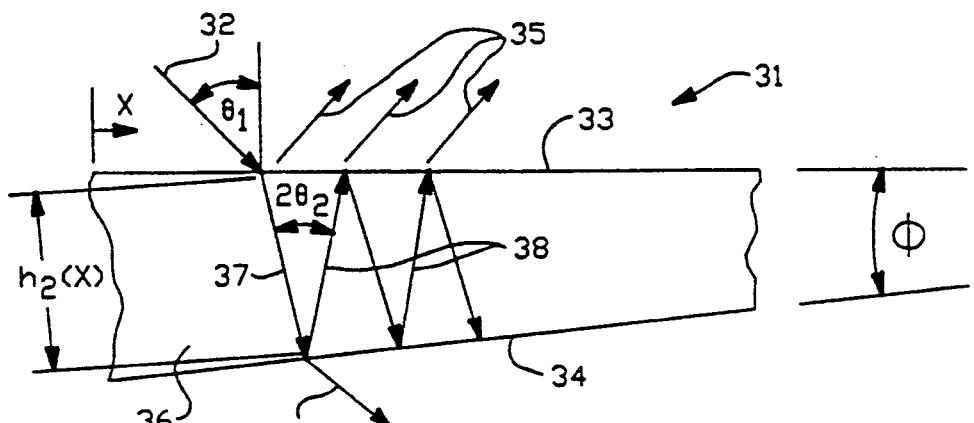
FIGS. 6, 7A and 7B are side views of three embodiments of the invention that operate in the reflection mode.

The invention may also be operated in the reflection mode, as illustrated in FIG. 6 for a simple etalon with quarter wave plate spacing between the reflective surfaces, if the amplitude reflection coefficient R of the first reflecting surface is low ($R \leq 0.2$). An incident light beam 32 approaches a first reflecting, light-receiving surface 33 of a modified etalon 31 at an incidence angle $\Theta_1$. The etalon 31 has a thickness $h_2(x)$, measured between two reflecting surfaces 33 and 34 of the device, that varies with a position coordinate x measured along a selected direction lying in the light-receiving surface 33. The incident light beam 32 is partly reflected at the surface 33, producing one of the reflected rays in an array 35 of such rays, and is partly transmitted at a refraction angle $\Theta_2$ into the etalon spacer material 36 in a well known manner. The refracted light beam 37 is partly reflected at the second reflecting surface 34 of the etalon 31, producing a reflected light beam 38 that propagates back toward the first reflecting surface 33. The remainder of the refracted light beam 37 is transmitted and emerges as another light beam 39 that is treated here as a rejected light beam. High reflection at the surfaces 33 and 34 can be suppressed, except for a narrow, sharply peaked wavelength pass band, by use of an appropriate anti-reflection coating at the surfaces. These coatings are discussed by H.A. McLeod, *Thin-Film Optical Filters*, op.cit., pp. 71-136.

The reflected light beam component 38 returns toward the first surface 33 and produces a second contribution to the array 35 of reflected light beams in a well known manner. The array 35 of approximately parallel, reflected light beams serves as a modified light source, with certain wavelengths accentuated or promoted, for subsequent applications or analysis. For the reflection mode, Eq. (2) above is operative, and the wavelengths $\lambda_c$ that are accentuated are determined by $$\sin(\beta/2) = \sin(2\pi n_2 h_2(x) \sec\Theta_2 \cos\Theta_1/\lambda_c) = \pm 1 \quad (7)$$

$$h_2(x) = (m - \tfrac{1}{2})\lambda_c \cos\Theta_2 \sec\Theta_1/n_2 \quad (m=1,2,\ldots) \quad (8)$$

If the etalon thickness $h_2(x)$ at a position x increases monotonically as x increases, for example, the central wavelengths $\lambda_c$ that are accentuated at a position x will vary with x according to Eq. (8), and a dispersion of wavelengths is obtained from the device.

Figure 7A:
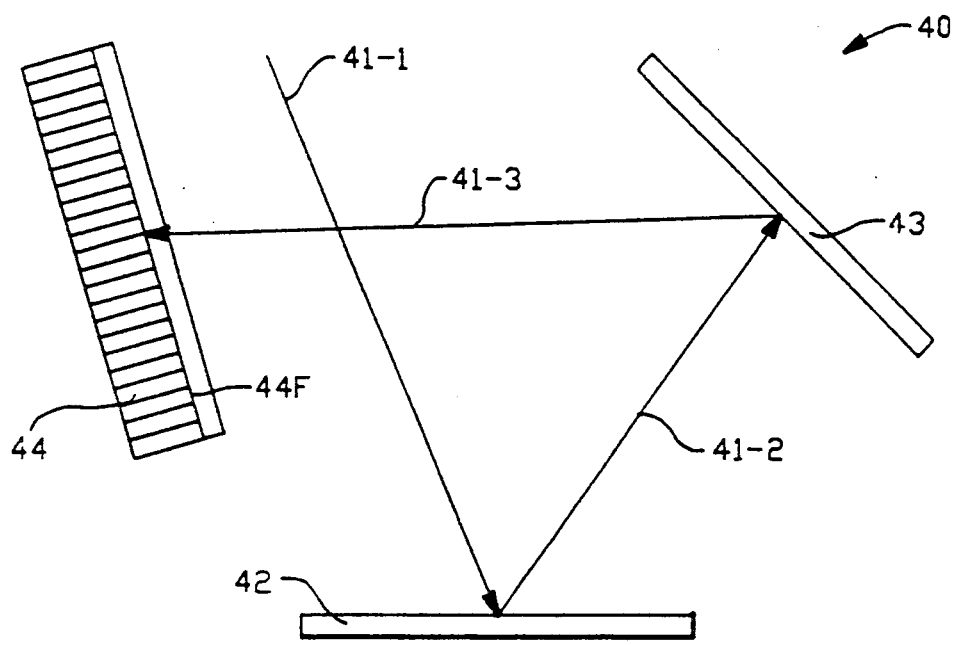

In another embodiment of the filter 40 for the invention, operating in the reflection mode, illustrated in FIG. 7A, an incident light beam 41-1 is reflected as a once-reflected beam 41-2 from a first reflecting surface and light filter 42. The once-reflected beam 41-2 is reflected as a twice-reflected beam 41-3 from a second reflecting surface and light filter 43, and the twice-reflected beam 41-3 is intercepted by a photosensor array 44 (optional) with another light filter 44F (optional) positioned adjacent to the array 44. One or more light filters may be positioned at each of the reflecting surfaces 42 and 43 and at the photosensor array 44. If no more than one such light filter is needed, the second light reflecting surface 43 may be deleted in the optical path. Three or more such reflecting surfaces may also be used, with a wavelength-tailoring filter on each such reflecting surface.

Figure 7B:
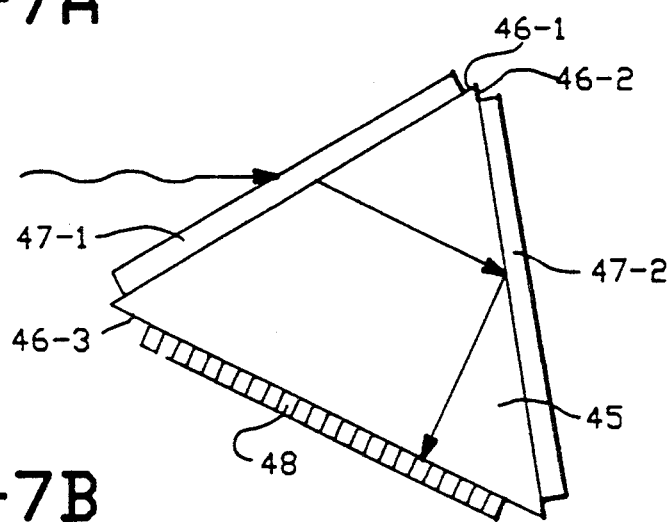

FIG. 7B illustrates another configuration that utilizes only the reflection mode. An optical prism 45, having a plurality of three or more planar surfaces and formed as a polygon, receives an incident light beam at a first face 46-1, which is preferably coated with an anti-reflection coating in order to transmit most of the light into the interior of the prism. The face 46-1 may also have a first wavelength filter 47-1, narrow band or broad band and constructed according to the invention, positioned on its surface. The light beam is refracted within the prism 45 and is reflected by internal reflection at a second prism face 46-2 at which a second narrow band or broad band wavelength filter 47-2 is positioned (optional). The reflected light beam then proceeds to a third face 46-3 of the prism where it may encounter a photosensor array 48 (optional) positioned thereon. Alternatively, the third prism face 46-3 may have a third wavelength filter (not shown in FIG. 7B) positioned thereon; or the face 46-3 may have an anti-reflection coating thereon to allow most or all of the light beam energy to pass out of the prism 45. Preferably, the light beam should approach the last face 46-3 of the prism encountered at approximately normal incidence.

For a high finesse system with effective reflectivity $R \leq 1$, where the finesse $F = \pi R^{\frac{1}{2}}/(1-R) >> 1$, the intensity reflection coefficient $I_r$ will generally be close to 1 except adjacent to wavelengths for which $\sin \beta/2 = 0$, where $I_r = 0$ and the spacer thickness $h_2(x)$ and the light wavelength $\lambda_c$ are related by Eq. (5). Where the reflection mode is used, then, it may be preferable to use a combination of a high pass edge filter and a low pass edge filter to provide an intensity reflection coefficient $I_r$ that is sharply peaked at a sequence of wavelengths (for fixed spacer stratum thickness) or at a sequence of spacer stratum thicknesses (for constant wavelength), as discussed in connection with FIGS. 8A, 8B, 8C and 8D.

Figure 8A:
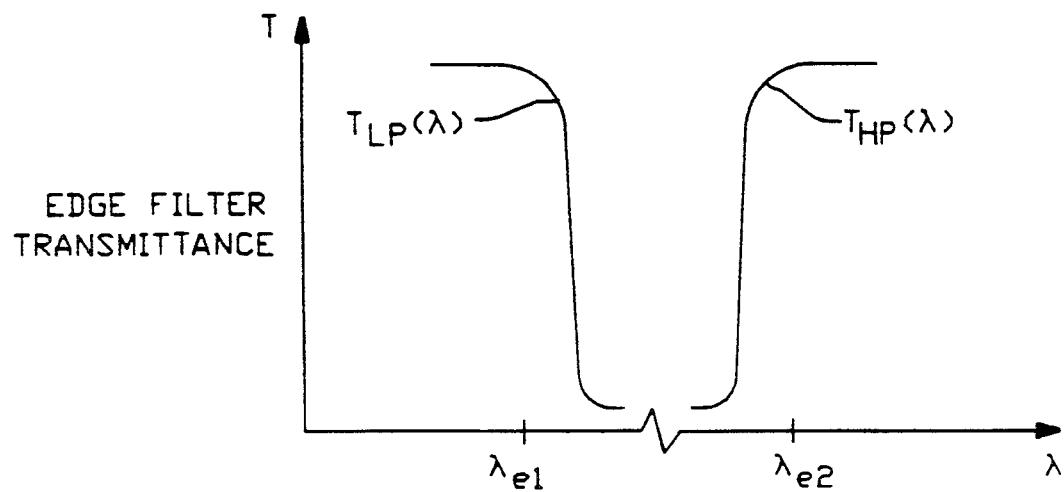
FIGS. 8A, 8B, 8C and 8D are plots illustrating light transmission through a high pass edge filter, a low pass edge filter, and combinations of these two filters, as used in the invention.
Figure 8B:
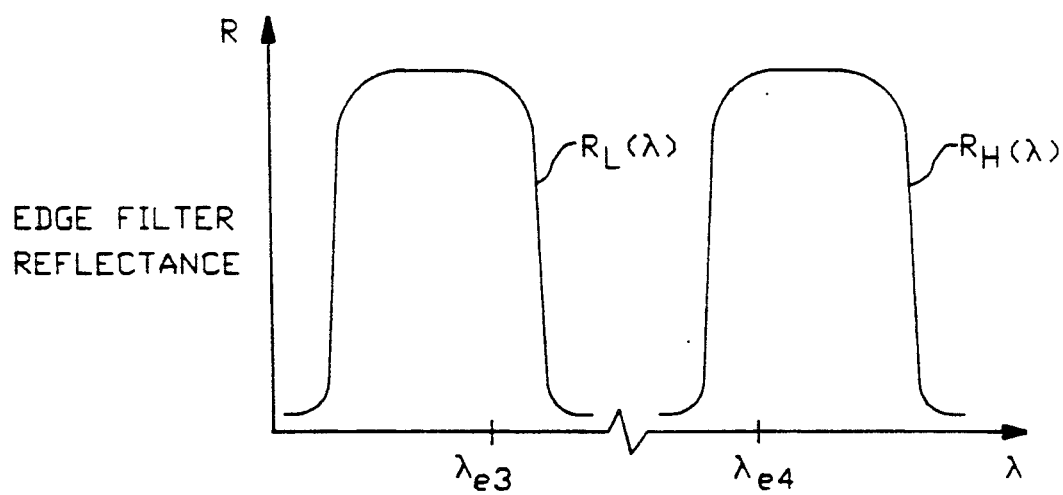
Figure 8C:
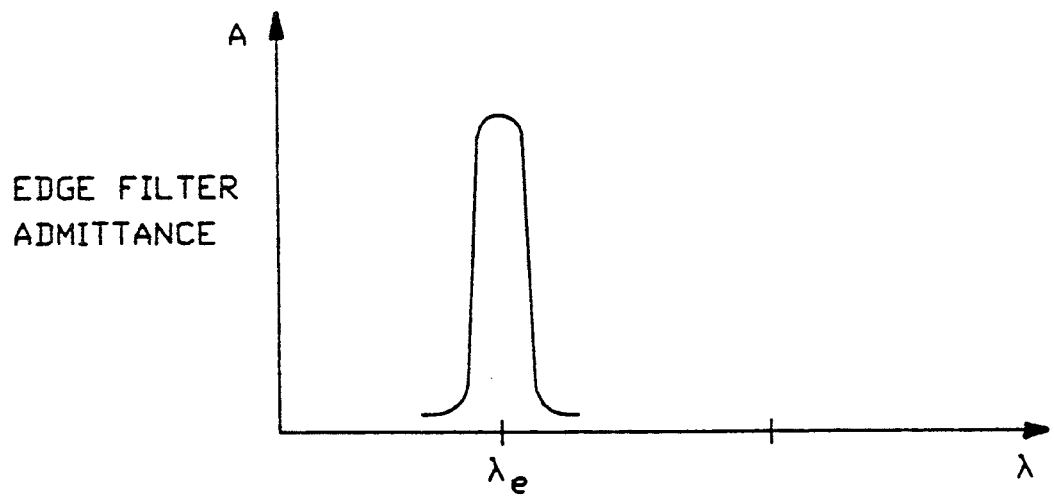

The modified etalons shown in FIGS. 3, 6, 7A and 7B may be replaced by compound edge filters to produce a narrow band of reflected (or transmitted) wavelengths, as illustrated in FIGS. 8A and 8C, or to produce a narrow band of reflected (or transmitted) wavelengths, as illustrated in FIGS. 8B and 8C. In FIG. 8A, the variation of light wave transmission $T_{HP}(\lambda)$ through a high pass edge filter and transmission $T_{LP}(\lambda)$ through a low pass edge filter are each shown as a function of wavelength. The low pass transmission filter has a "knee" wavelength $\lambda = \lambda_{e1}$, for which $\lambda \leq \lambda_1$ insures that $T_{LP}(\lambda)$ is near its maximum value; and for $\lambda > \lambda_{e1}$ and increasing, $T_{LP}(\lambda)$ falls rapidly to approximately zero. The high pass transmission filter has a knee wavelength $\lambda = \lambda_{e2}$, for which $\lambda = \lambda_{e2}$ insures that $T_{HP}(\lambda)$ is near its maximum value; and for $\lambda < \lambda_{e2}$ and decreasing, $T_{HP}(\lambda)$ falls rapidly to approximately zero, as illustrated in FIG. 8A. If the low pass and high pass transmission filters are chosen so that $\lambda_{e1} \cong \lambda_{e2}$, the serial combination of these two filters will provide a composite transmission filter with an admittance $I(\lambda)$ (here, admittance refers to transmittance) that has a sharply peaked, narrow pass band at a central wavelength $\lambda_c = \lambda_{e1} = \lambda_{e2}$, as illustrated in FIG. 8C.

In FIG. 8B, the variation of light wave reflectance $R_{LP}(\lambda)$ from a low end band pass edge filter and reflectance $R_{HP}(\lambda)$ from a high end band pass edge filter are each shown as a function of $\lambda$. The low end reflection filter has a knee wavelength $\lambda = \lambda_{e3}$, for which $\lambda \leq \lambda_{e3}$ insures that $R_{LP}(\lambda)$ is near its maximum value; and for $\lambda > \lambda_{e3}$ and increasing $R_{LP}(\lambda)$ falls rapidly to approximately zero, as shown in FIG. 8B. The high end reflection filter has a knee wavelength at $\lambda = \lambda_{e4}$, for which $\lambda \geq \lambda_{e4}$ insures that $R_{HP}(\lambda)$ is near its maximum value; and for $\lambda < \lambda_{e4}$ and decreasing $R_{HP}(\lambda)$ falls rapidly to approximately zero, as illustrated in FIG. 8B. If the low end and high end reflection filters are chosen so that $\lambda_{e3} \cong \lambda_{e4}$, the serial combination of these two filters will provide a composite reflection filter with an admittance $I(\lambda)$ (here, admittance refers to reflectance) that has a sharply peaked, narrow pass band at a central wavelength $\lambda_c \cong \lambda_{e3} = \lambda_{e4}$, as illustrated in FIG. 8C.

Figure 8D:
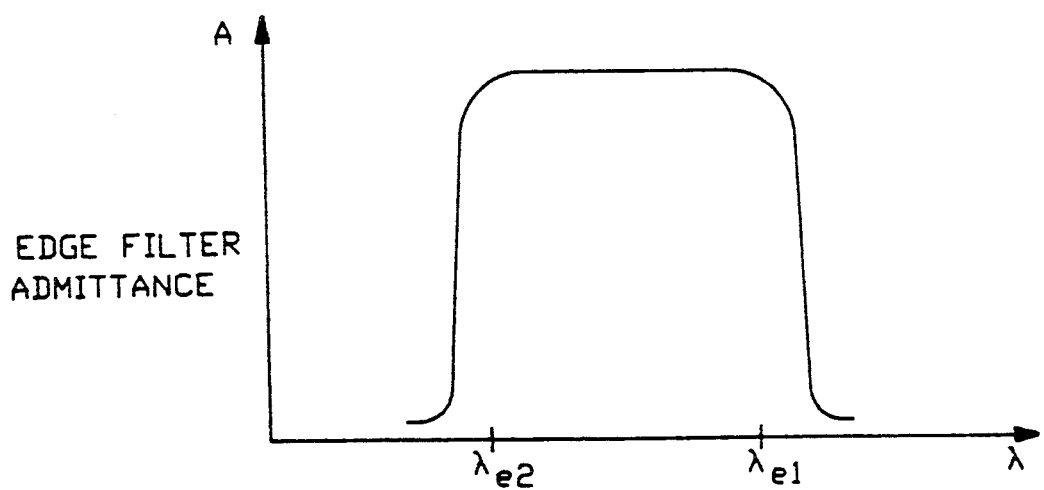

In FIG. 8D, the two knee wavelengths $\lambda_{e1}$ and $\lambda_{e2}$ from FIG. 8A are spaced further apart $\lambda_{e2} < \lambda_{e1}$, and the result is a broad band pass filter as shown.

In each of the other embodiments discussed below, although the transmission mode of operation is discussed the invention may also be operated in the reflection mode, by analogy to FIGS. 6, 7A, 7B, 8A, 8B, 8C and the above discussions thereof.

Figure 9:
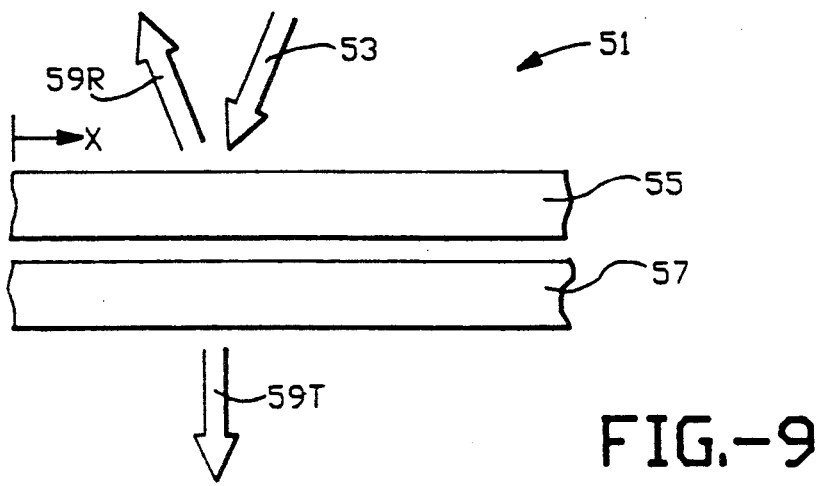
FIG. 9 is a side view of an embodiment that uses a serial combination of a high pass edge filter and a low pass edge filter.

With reference to FIG. 9, if a light beam 53 is passed serially through a high pass edge filter 55 and through a low pass edge filter 57, both variable wavelength, in either order, in the filter embodiment 51, and if the two edge filter knee wavelengths are related as discussed in connection with FIGS. 8A and 8B, the desired light beam 59T (transmitted mode) or 59R (reflected mode) that emerges from the edge filter combination will have a band of wavelengths centered approximately at a wavelength $\lambda_c(x)$ that varies monotonically with the coordinate x. For fixed position x, the reflected intensity of the beam 59R (or transmitted intensity of the beam 59T) issuing from the combination of two edge filters shown in FIG. 9 will resemble the intensity shown in FIG. 5.

In another embodiment, an incident light beam may be directed to a broad band pass filter, constructed with variable central wavelength $\lambda_c$ according to any of FIGS. 3, 6, 7 and 9 or with a fixed broad pass band, and the resulting transmitted or reflected light beam may then be directed to a narrow band wavelength filter with variable central wavelength $\lambda_c$ that is also constructed in accordance with one of these Figures. The serial arrangement of the broad band pass filter and narrow band pass filter, in either order, would be similar to the serial arrangement of two edge filters shown in FIG. 9. The broad band pass wavelength filter will remove wavelengths from all nearby pass bands from the incident light beam except the desired central band wavelengths so that no fringes appear in the light beam that issues from the combined filters.

Figure 10:
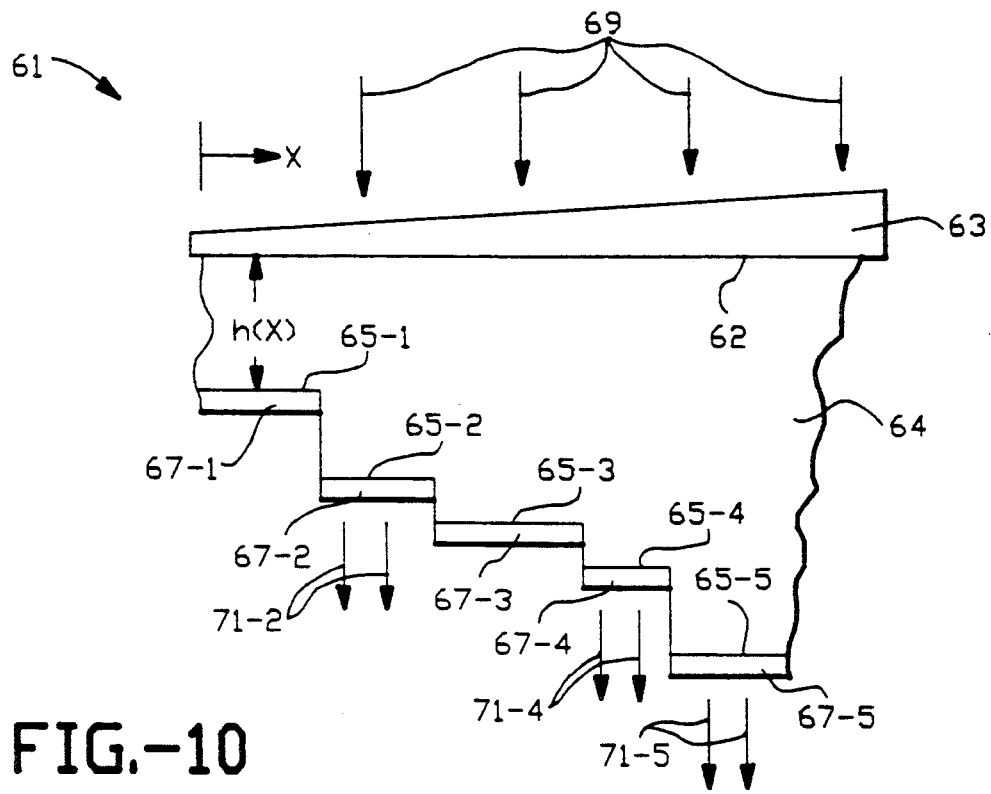
FIGS. 10 and 11 are side views of another embodiment of the invention in which one of the planar reflecting layers is replaced by a reflecting layer having a staircase configuration.

FIG. 10 illustrates another embodiment of the filter 61 of the invention, which includes a spacer stratum 63, a reflecting surface, arranged in a staircase configuration and consisting of a sequence of planar staircase segment surfaces 65-1, 65-2, 65-3, 65-4 and 65-5, and a staircased spacer stratum 64. Each staircase segment surface 65-q is planar and is spaced apart from and approximately parallel to the plane of a first reflecting surface 62 of stratum 63, with a distance of separation h(x) between a nearest reflecting surface of the stratum 63 and a staircase surface 65-q that is constant for a small range of the coordinate x and is increasing monotonically with the spatial coordinate x measured in a selected direction in a light-receiving plane of the stratum 63. Each staircase segment 65-q optionally has a filter layer 67-q (q=1,2,3,4,5) deposited on or adjacent to the front or back reflecting surface of the staircase segment. The spacer stratum 64 behaves as a narrow band pass light filter with variable spacer layer thickness h(x). The stratum 63 serves as a wide band pass filter whose thickness may be constant or may be monotonically increasing with x. In another embodiment, the stratum 63 may serve as a narrow band pass filter and the spacer stratum 64 may serve as a broad band pass filter, with each staircase segment 65-q defining a different broad pass band for the device 72.

an incident light beam 69 is partly transmitted through the stratum 63 and through the staircased spacer stratum 64 and emerges as a transmitted light beam 71-q (q=2, 4 and 5 are shown in FIG. 10) that exhibits interference effects similar to those discussed above in connection with FIGS. 3 and 5. The interference effects vary by small increments from one staircase segment to the next; but within a given staircase segment the system behaves as a variable wavelength filter similar to that of FIG. 3. The strata 63 and 64 may be contiguous or may be spaced apart from one another.

Figure 11:
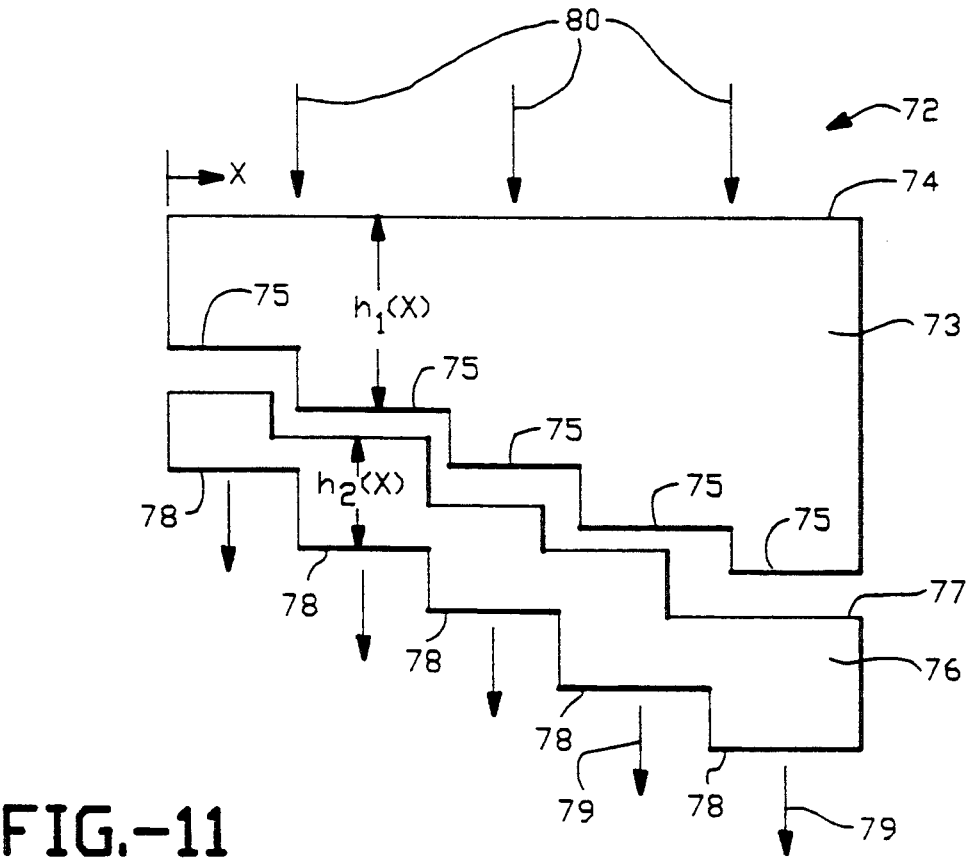

In an alternative embodiment of the filter 72, shown in FIG. 11, a first spacer stratum 73 has a first reflecting surface 74 that is approximately planar and has a second reflecting surface 75 that is formed in a staircase configuration with a monotonically increasing distance of separation $h_1(x)$ between the surfaces 74 and 75. A second spacer stratum 76 has a second staircase configuration surface 77 as a first reflecting surface and has a third staircase configuration surface 78 as a second reflecting surface, with the distance of separation $h_2(x)$ between the two surfaces 77 and 78 being monotonically increasing in x. One of the two spacer strata 73 and 76 serves as a narrow band pass filter, and the other stratum serves as a wide band pass filter. An incident light beam 80 passes through both spacer strata 73 and 76 and issues from the embodiment of the filter 72 as a sequence of light beamlets 79, each with a narrow wavelength range. The spacer strata 73 and 76 may be contiguous or may be spaced apart from one another.

A "staircase configuration", as used herein, will refer to a configuration similar to that illustrated in FIG. 10, where a sequence of two or more planar reflecting segments is arranged so that each segment is approximately parallel to a given plane (for example, a plane of the stratum 63 in FIG. 10), and the distance of separation of the sequence of staircase segments from the given plane increases monotonically as one proceeds consecutively from one segment to the next. The spacer stratum 76 in FIG. 11 has two reflecting surfaces 77 and 78, each of which is formed in a staircase configuration.

Figure 12A:
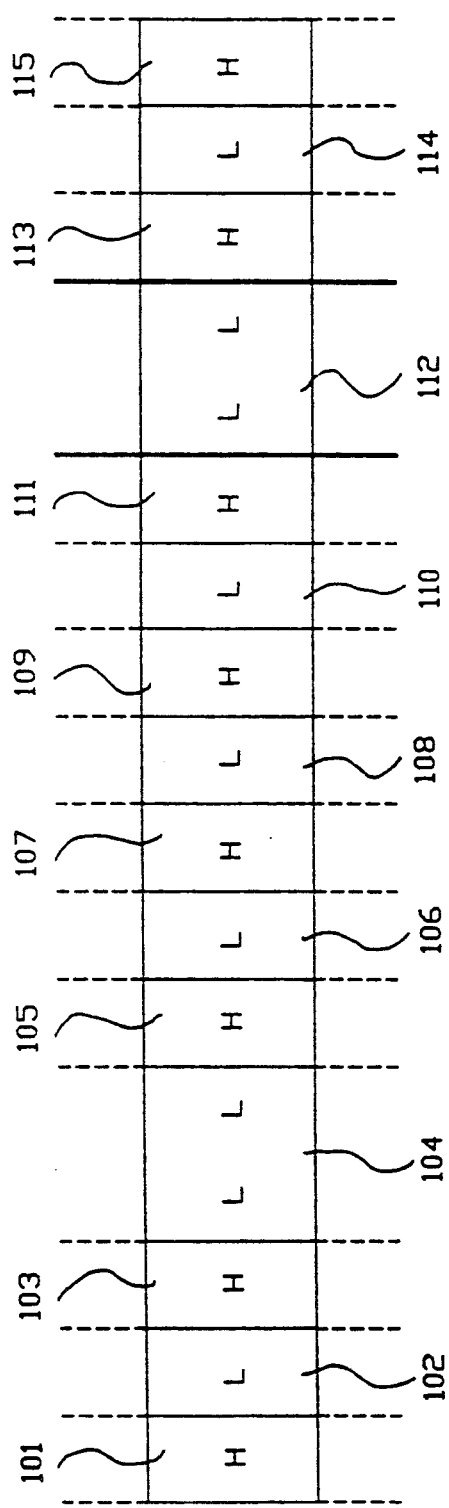
FIGS. 12A and 12B are cross-sectional views of two versions of a multilayer thin film filter configuration suitable for implementing an embodiment of the invention.
Figure 16:
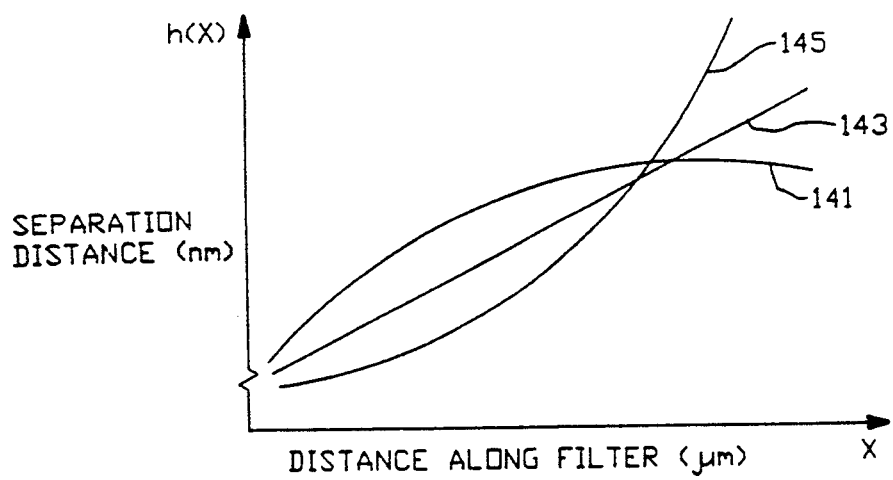
FIG. 16 is a plot of several possible variations with distance x of the separation distance h(x) of two adjacent reflecting surfaces within the filter in a selected direction.

Normally, a tradeoff must be made between narrowness of the wavelength pass band and transmission. McLeod, in his treatise *Thin-Film Optical Filters*, op. cit., pp. 270-276, discusses the use of a multi-layer thin film light filter to produce a very narrow, approximately rectangularly shaped optical transmission band with adequate transmission. FIG. 12A illustrates construction of one embodiment of a double half wave ("DHW") thin film filter that will provide such a band. For a fixed wavelength $\lambda_f$, a plurality of optically transparent layers of alternating high (H) and low (L) refractive indices $n_H$ and $n_L$, respectively, are positioned contiguously as shown. High index layers (H) 101, 103, 105, 107, 109, 111, 113 and 115 are each quarter wave plates for the high index $n_H$. Low index layers (L) 102, 106, 108, 110 and 114 are each quarter wave plates for the low index $n_L$. Low index layers 104 and 112 are each half wave plates and thus function as Fabry-Perot etalons. Each of these two etalons 104 and 112 has substantially 0 percent reflectance and 100 percent transmittance at the center wavelength $\lambda = \lambda_f$. However, the reflectance quickly rises toward 100 percent on either side of the valley at wavelength $\lambda = \lambda_f$. In a multi-layer thin film embodiment of the invention, the two half wave plate layers such as 104 and 112 would each have a thickness that varies monotonically along a selected direction in a plane of the film. The computed transmittance of the thin film configuration shown in FIG. 13A, for the choices of refractive indices $n_H=2.40$ (TiO$_2$) and $n_L=1.45$ (quartz), is shown in FIG. 16 (similar to FIG. 7.14 of McLeod, op. cit.) as a function of the wavelength ratio $g=\lambda_f/\lambda$ ($\lambda$ variable). The computed transmittance has a moderate width peak with a steeply rising or steeply falling curve at $|1-\lambda_f/\lambda| \approx 0.05$ and some side band structure for $\lambda > \lambda_f$. FIG. 13B illustrates the computed transmittance of a configuration similar to that of FIG. 12A in which the two half wave plate layers are of high refractive index material rather than low refractive index material, another suitable embodiment of the invention.

One embodiment of the invention uses a first multi-layer film filter stack with approximately constant reflectance over the wavelength band of interest and a second multilayer thin film filter stack in which the reflectance increases rapidly from a very low value in a narrow wavelength band (positioned at a central wavelength $\lambda_c$) to a much higher reflectance value just outside this narrow band. The wavelength $\lambda_c$ is determined by a thickness $h_2$ of a layer in the second film stack, and the thickness $h_2$ is caused to increase monotonically with increase of a spatial coordinate x measured in a selected direction in the light-receiving plane of the filter. Serial combination of the first and second thin film filter stacks produces a very narrow band filter, centered at a wavelength $\lambda_c$ that varies monotonically with position x in the selected direction. These two filter stacks are serially combined with a wide band pass filter that is transmitting at wavelength $\lambda = \lambda_c$, in order to remove any undesirable side band structure and produce a single narrow band pass filter with a central wavelength $\lambda_c$ that increases monotonically with change in position in a selected direction in a light-receiving plane of the filter.

Figure 12B:
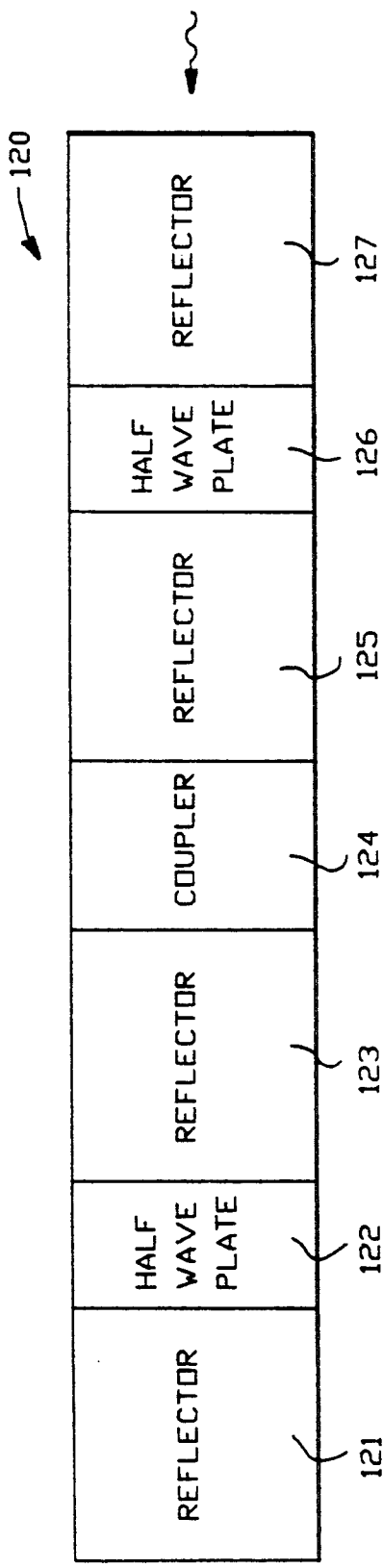
Figure 14:
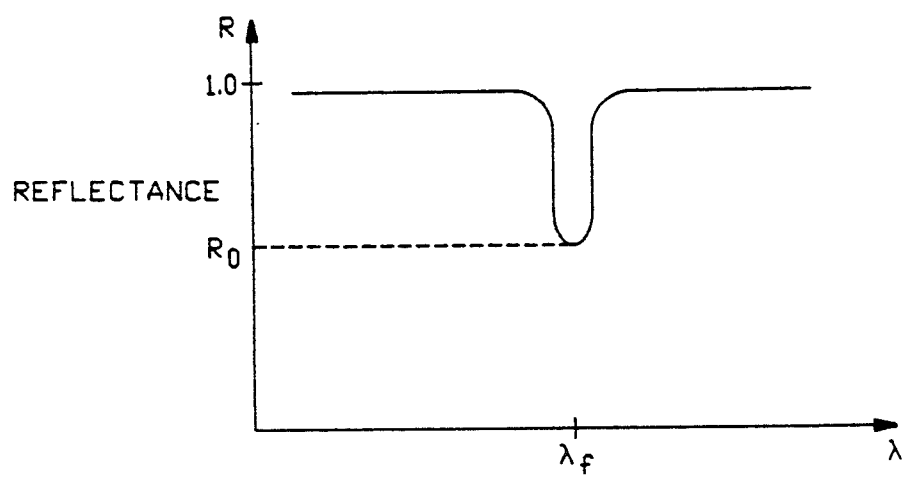
FIG. 14 is a plot of reflectance of a light beam as a function of wavelength for the embodiment shown in FIG. 12B.

With reference to FIGS. 12A and 12B, the quarter wave plates 101, 102, 103 serve as a first reflector 121; the plates 105, 106 and 107 serve as a second reflector 123; the plates 109, 110 and 111 serve as a third reflector 125; the plates 113, 114 and 115 serve as a fourth reflector; the double thickness plates 104 and 112 serve as half wave plates; and the plate 108 serves as an optical coupler in the embodiment of the filter 120 shown in FIG. 12B. The optical coupler is optional and may be deleted here. The combination of the reflectors 121 and 123 and the half wave plate 122 as shown in FIG. 12B provides a special reflector whose light reflectance R as a function of wavelength $\lambda$ is illustrated in FIG. 14. The reflectance has a high value, near 1.0, over most of the range of the wavelength $\lambda$, except for a narrow wavelength interval centered at $\lambda = \lambda_f$, where the reflectance drops sharply to a lower value $R_0$. The special reflector consisting of the elements 121, 122 and 123 in FIG. 12B, may be used by itself or may be concatenated with other, similar special reflectors, with or without optical couplers 124 interposed, to provide a narrow, sharply peaked transmittance T ($\approx 1-R$) at the selected wavelength $\lambda = \lambda_f$.

A multi-layer thin film filter that produces the desired narrow, sharp peaks in reflectance or transmittance is not limited to the configuration shown in FIG. 12A. The half wave plates 104 and 112 may consist of high refractive index material, or the positions of the high and low index materials may be exchanged, or both of these changes may be made. Further, each of the four groups of quarter wave plates (101, 102, 103), (105, 106, 107), (109, 110, 111) and (113, 114, 115) shown in FIG.

12A may each be replaced by an odd number (1,3,5,7,9, ...) of quarter wave plates of alternating refractive index (high/low) material. An example of this is shown in FIG. 15, in which four quarter wave plates 131, 133, 135 and 137 of low index serve as reflectors, two double thickness plates 132 and 136 of high index serve as half wave plates, and a quarter wave plate 134 of high index serves as an optical coupler, analogous to the arrangement shown in FIG. 12B.

Reduced to its minimum, a multi-layer thin film filter of the type shown in FIGS. 12A, 12B and 15, that produces a narrow, sharp peak in transmittance or reflectance requires $N_1$ ($\geq 4$) quarter wave plates of high (or low) refractive index alternating with $N_1-1$ (or $N_1-2$) wave plates of low (or high) refractive index, where $N_1-3$ of these latter $N_1-1$ plates are quarter wave plates and the remaining two of these plates are half wave plates. In another embodiment, represented by the wave plates 131, 132 and 133 in FIG. 15, a suitable multi-layer thin film filter requires $N_2$ ($\geq 2$) quarter wave plates of high (or low refractive index alternating with $N_2-1$ plates of low (or high) refractive index, where one of these $N_2-1$ plates of low (or high) index is a half wave plate and the remaining $N_2-2$ such plates are quarter wave plates. In either of these configurations, each half wave plate has variable thickness.

Thin film optical layers are most commonly manufactured by vacuum deposition. In this process, each thin film is condensed from the vapor phase onto the substrate in a vacuum chamber. The substrate is held at a temperature somewhat below the solidification temperature of the film. A variety of techniques are used to vaporize the film material. These include ion bombardment (sputtering), thermal evaporation, electron beam bombardment and other techniques.

The non-constant separation distance $h(x)$ of two substrates, two surfaces of a single substrate, or two surfaces of a single filter layer, should preferably vary continuously, with the exception of the staircase configuration shown in FIGS. 10 and 11. The shape function $h(x)$ may vary linearly with x or may vary non-linearly with x, for example as $a+bx^k$ with $k<1$, $k=1$ or $k>1$, as illustrated in the curves 141, 143 and 145, respectively, in FIG. 16.

For $k=1$, a sequence of uniform width wavelength intervals will correspond to uniform widths on the variable wavelength filter. For $k>1$, these wavelength intervals will have greater width at the low wavelength end than at the high wavelength end of the filter. This configuration would be useful where the light is to be dispersed more broadly at the low wavelength end and will cause the filter to transmit a smaller amount of light per unit length at the low wavelength end of the filter, as compared to the high wavelength end. For $k<1$ the conditions are reversed, and the filter disperses light less at the low wavelength end. This configuration is useful if, as usually occurs, the photosensors used have reduced sensitivity to light at lower wavelength (for example, at $\lambda \approx 400$ nm) so that more light reception is needed for each photosensor at the low wavelength end. Alternatively, the photosensors may have non-uniform widths, with greater widths at the low wavelength end than at the high wavelength end. The separation distance $h(x)$ is not limited to functions of the form $a+bx^k$. Exponential, trigonometric, logarithmic and other similar shape functions $h(x)$ may also be used here.

Figure 17:
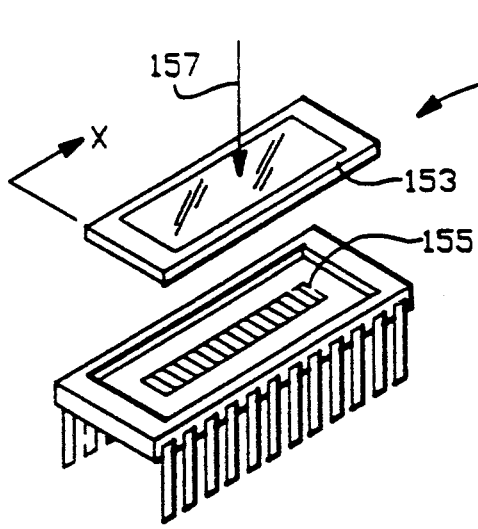
FIGS. 17 and 18 are perspective views showing the use of one filter or two filters laid end-to-end, respectively, according to the invention, together with an array of photosensitive elements.

FIG. 17 illustrates the use of the wavelength filter in spectrophotometer apparatus 151 that can be contained on a single semiconductor chip if desired. A spectrophotometer filter 153, fabricated in accordance with any of the embodiments discussed herein, is positioned so that it overlies and is adjacent to a linear array 155 of photosensor elements extending in the selected direction x. Each photosensor element has a finite width w that may be of the order of 50 $\mu$m or less so that the linear array 155 of photosensor elements has a finite number of such elements present. Each of these photosensor elements receives a transmitted (or reflected) portion of an incident light beam 157 that issues from the filter 153 for a small interval $x_0-w/2 \leq x \leq x_0+w/2$ of the spatial coordinate x, where $x_0$ is the central value of x in this interval. The wavelength increment per photosensor element is as small as $\Delta\lambda_c = 1$ nm (nanometer) or as large as one wishes in one embodiment of this invention. Thus, the result of the interference effects will differ from one photosensor element to an adjacent element, and the wavelength(s) corresponding to a peak of transmitted intensity will also vary from one photosensor element to the next. Used in this manner, the linear array 155 of photosensor elements will distinguish between wavelengths on the basis of different peak wavelengths that are present in the narrow wavelength interval or portion of the light beam received by each photosensor element.

Photosensors suitable for the present invention are well known in the art and readily available commercially. The devices are offered in single and two dimensional arrays over a variety of photoelement aperture sizes, spectral sensitivity ranges, signal transfer techniques and package configurations. The linear, area and circular silicon photodiode arrays produced by EG&G Reticon Corp., Sunnyvale, California are representative devices for applications operating over the near ultraviolet to near infrared spectral range. These devices have relatively large photoelement areas, e.g. 50 microns by 100-2500 microns and are well suited for spectroscopic applications. Typical commercial array sizes are 128 to 2048 elements in a linear array, 256 by 256 element to 64 by 2048 elements in an area array, and 64 to 720 elements in circular arrays. The photoelements are typically processed on a ceramic substrate and housed in a standard dual in-line package that is pin compatible with integrated circuit sockets. Photoelements made of different materials can be used to extend photosensitivity to, or to alter photosensitivity in, other spectral ranges. For example, HgCdTe and InSb are often used in infrared sensors. Suitable photosensor materials for differing spectral ranges are well known and are discussed in L.R. Masten, "*Understanding Optronics*", Texas Instruments Learning Center, 1981, Chaps. 3, 4 and 7.

In a simple construction of the spectrophotometer, the filter substrate or a set of filter substrates is mounted to the surface of the photoelement package. To minimize the spacing between the photoelement array and the filter, the filter and sensor may be coupled optically through a fiber face plate. Sensors prefabricated with fiber face plates are offered commercially by EG&G Reticon, op. cit. The fiber face plate and minimized spacing reduce the possibility of bandpass broadening with high numeric aperture light incidence.

The projection of light on the photosensor face may be facilitated by use of a lens or lenses located on the object or image side of the filter substrate or substrates. For example, a projection lens can be mounted between the filter and sensor so that the filter and sensor are separated by some distance as shown in FIG. 22B, discussed below. In this configuration, the active dimension of the filter becomes related to the active dimension of the sensor through the magnification of the lens. In this manner, a relatively small dimension filter can be projected to a relatively large dimension sensor for increased resolution. Alternatively, a large dimension filter can be projected to a small dimension sensor for increased light sensitivity or economy.

Figure 19:
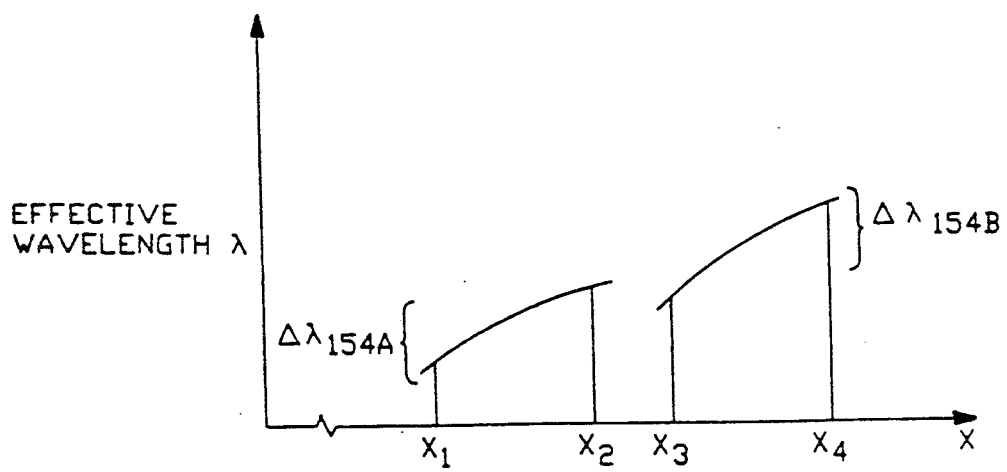
FIG. 19 is a plot illustrating partial overlap of selected wavelength bands versus spatial displacement of two filters constructed according to the invention.
Figure 18:
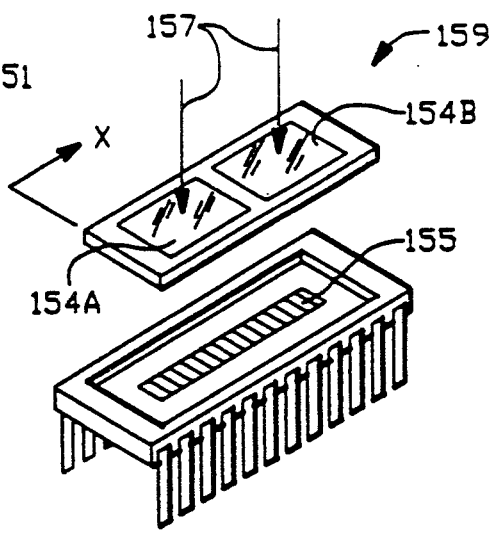

FIG. 18 illustrates an embodiment of the filter 159 that includes two or more filters 154A and 154B to each receive and transmit a portion of a light beam 157, with each such filter having a non-overlapping or partially overlapping wavelength interval for which that filter is effective, and one or more photosensor arrays 155. This allows a single spectrophotometer to cover an increased wavelength range of any reasonable size with a single instrument, including the visible region and portions of the ultraviolet and infrared regions if desired. FIG. 19 illustrates the partial overlap of two wavelength intervals, denoted $\Delta\lambda 154A$ and $\Delta\lambda 154B$, for the two adjacent filters 154A and 154B in FIG. 18, the first filter being effective for the coordinate range $x_1 \leq x \leq x_2$ and the second filter being effective for the coordinate range $x_3 \leq x \leq x_4$ where $x_1 < x_2 < x_3 < x_4$.

Figure 20:
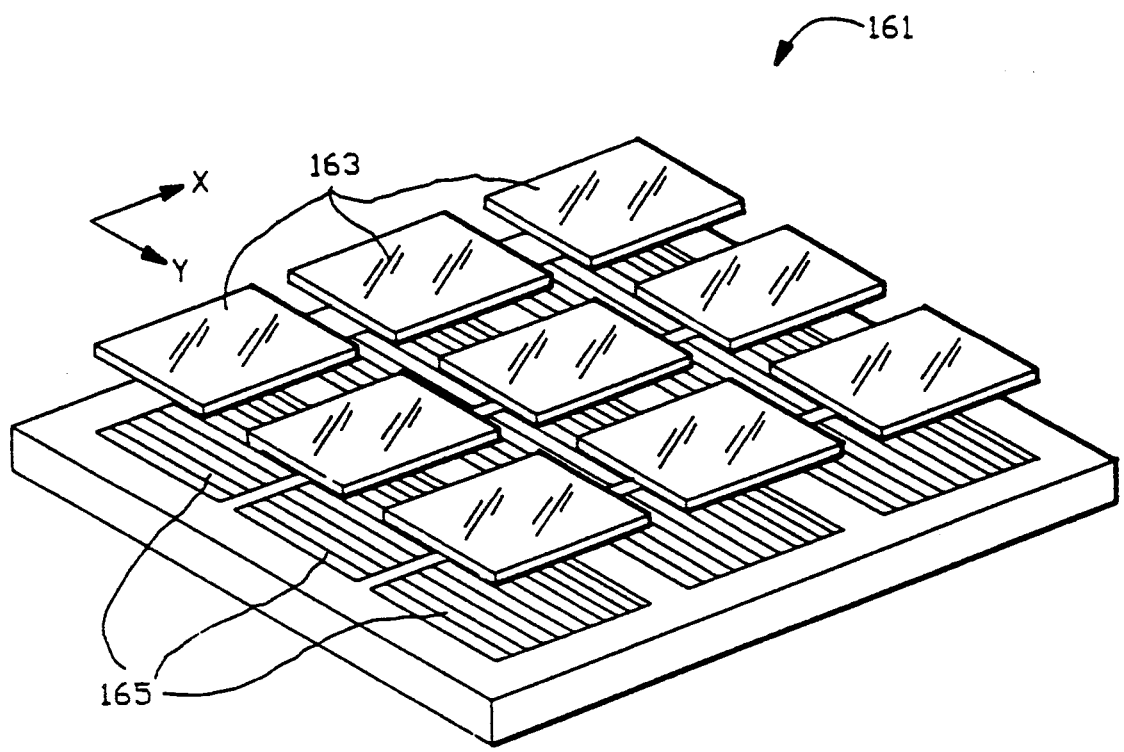
FIG. 20 is a perspective view of an embodiment that utilizes a two-dimensional array of filters and photosensors.

FIG. 18 illustrates the use of two or more light filters and photosensor arrays in an end-to-end configuration 159. A two-dimensional array of light filters 160 and a two-dimensional array of photosensors 162 can be combined, as shown in the embodiment 158 in FIG. 20. In the two-dimensional array shown in FIG. 20, a central wavelength $\lambda_c(x,y)$ could vary continuously and monotonically with the coordinate x and could vary monotonically, either continuously or by discrete amounts, with the coordinate y, measured in a direction perpendicular to the x direction.

Figure 21A:
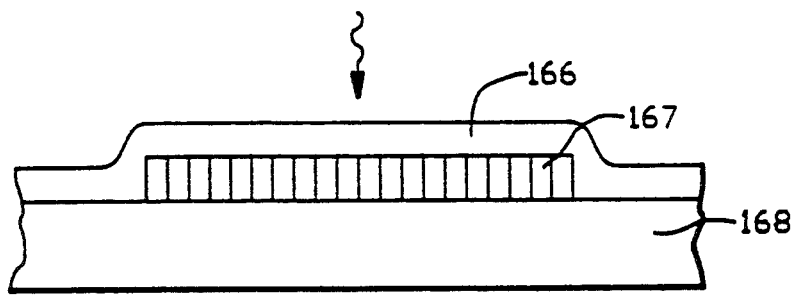
FIGS. 21A, 21B and 21C are side views of three embodiments that allow a wavelength filter and a photosensor array to be positioned contiguous to one another, according to the invention.
Figure 21B:
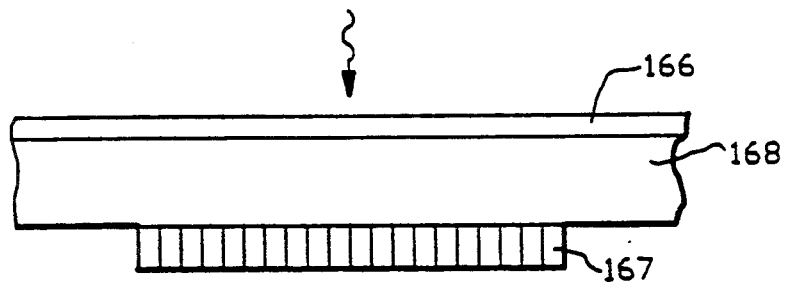
Figure 21C:
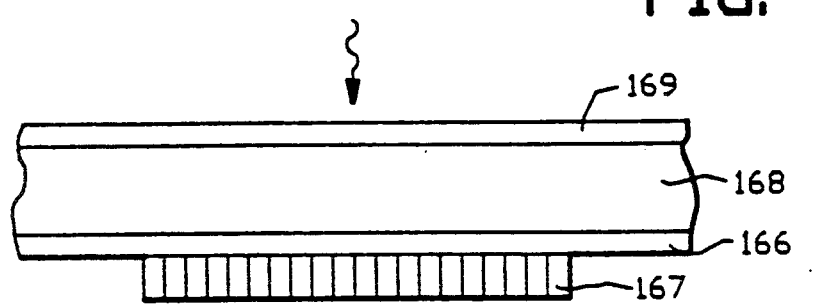

FIGS. 21A, 21B and 21C illustrate three embodiments that allow a narrow band filter 166 and a sensor 167 to reside on a common substrate 168. Several sensor processes allow deposition of photosensitive material and driving circuits on glass substrates. One such process is described by Shinji Morozumi, et al., in "Completely Integrated a-Si:H Linear Image Sensor with Poly Si T.F.T Drivers", Extended Abstracts of the 16th (1984 International) Conference on Solid State Devices and Materials, Kobe, 1984, pp. 559–562. The sensor is constructed by depositing poly-silicon thin film transistor switches and amorphous silicon diodes on glass. Photodiode array sensors on glass substrates are offered commercially by Ovonic Imaging Systems, Troy, Michigan, Suwa Seikosha Co., Ltd., Japan, and others. The ability to deposit both filter and sensor on silicon dioxide (quartz or glass), and further, the ability for one of the multicomponent layers of the filter to be silicon dioxide, allows the filter and sensor to share a common substrate, sharing opposite sides of the substrate, or deposited, one over the other, on a common side of the substrate.

In the embodiment of FIG. 21C, a broad band pass filter 169 is positioned on another light-receiving surface of the substrate 168. Alternatively, a broad band pass filter material may be incorporated with the substrate 168 so that no additional stratum or layer is required, as suggested in FIGS. 21A and 21B. In this instance the substrate may be a "colored glass" that transmits light wavelengths only within a pass band of modest width. For example, colored glass of Schott glass type UG1 and UG11 is available from Melles Griot that transmits only in the wavelength bands 275 nm $< \lambda <$ 405 nm and $\lambda >$ 680 nm (for UG1) and 240 nm $< \lambda <$ 395 nm and 660 nm $< \lambda <$ 800 nm (for UG11).

Preferably, the filter shown in any of FIGS. 3, 6–11, 12, 16, 17 and 20 includes: (1) a broad band pass filter that attenuates any light of wavelength lying outside a sharply defined pass band including a central wavelength $\lambda = \lambda_c$ and (2) a narrow band pass filter that has a central wavelength $\lambda = \lambda_c$ lying in the narrow pass band, with any other multiples or side bands of this wavelength for which the narrow pass band filter is transmitting being heavily attenuated by the broad band pass filter. The narrow band pass filter and, optionally, the broad band pass filter, will have central wavelengths $\lambda = \lambda_c$ that vary with position x along the filter.

Figure 22A:
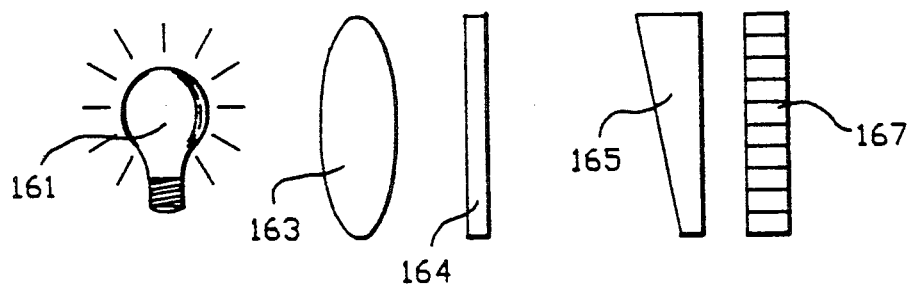
FIGS. 22A and 22B are schematic views of two arrangements of light sources and optics that may be used to practice the invention.
Figure 22B:
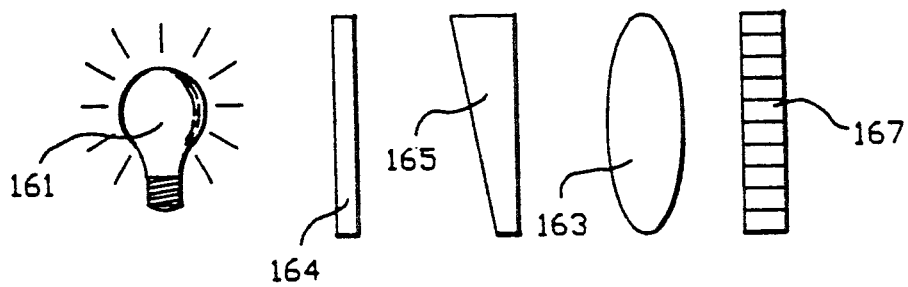

FIG. 22A illustrates one suitable arrangement of light source and optics to practice the invention. A light source 161 produces a light beam that passes through a lens 163 or other focusing optics and is directed toward a variable wavelength filter system 165, constructed according to the invention. The filter system 165 may include a narrow band filter or a combination of narrow band and broad band filters as discussed herein. The incident light beam is then filtered by the variable wavelength filter 165 and is received by a photosensor array 167, which may be one-dimensional or two-dimensional. Optionally, a light diffuser or concentrator or rearranger 164 may be included adjacent to the lens or focusing optics 163, in order to cause the light received at the filter 165 (1) to be more uniform across the filter, (2) to be more concentrated in one region of the filter such as at the low-wavelength-pass end, or (3) to be rearranged in some other suitable manner. FIG. 22B illustrates an alternative arrangement of light source and optics in which the lens 163 is positioned between the variable wavelength filter system 165 and the photosensor array 167. In the embodiment of FIG. 22A, the filter system 165 and photosensor array 167 may be contiguous to one another or may be spaced apart from one another.

Figure 23:
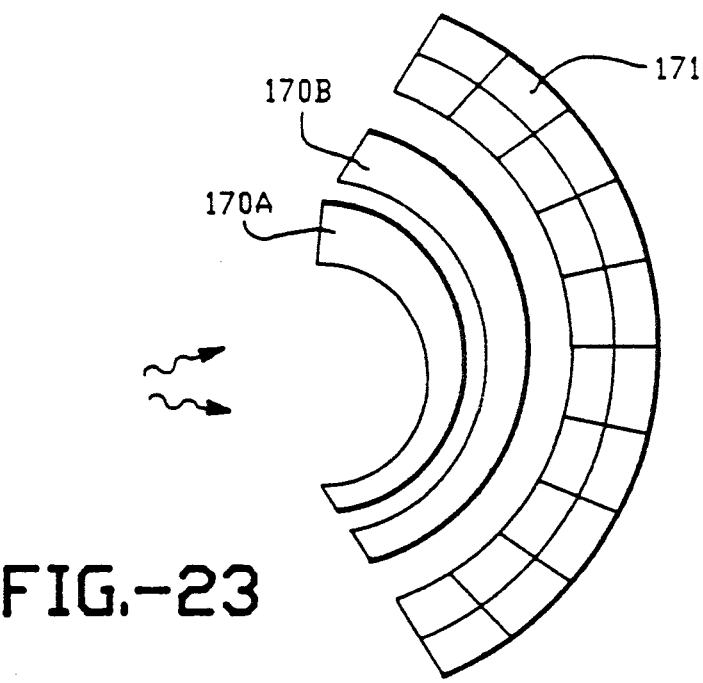
FIG. 23 is a plan view of a light filter and sensor system, constructed according to the invention in a circular or other curvilinear configuration.

The one-dimensional photosensor arrays shown in FIGS. 17 and 18 are linear arrays. A photosensor array may also be arranged as a circular or other curvilinear array as illustrated in FIG. 23. In FIG. 23, a narrow band pass variable wavelength filter 170A and, optionally, a broad band pass filter 170B, arranged in a circular or other curvilinear configuration, receives and filters an incident light beam, and the wavelength-filtered beam is then received by a photosensor array 171, also arranged in a circular or other curvilinear configuration. A two-dimensional circular or curvilinear photosensor array, analogous to the rectangular array 162 shown in FIG. 20, may also be used here. The area or a linear dimension of each of the photosensors may be non-uniform here.

If the variable wavelength filter and/or the photosensor array are curvilinearly shaped, it may be necessary to provide photosensors with non-uniform widths in order to provide approximately equal width wavelength intervals for each photosensor.

The combination of filter array and photosensor array can be provided on a single chip that is rugged and reliable and has relatively low cost. Two adjacent photosensor elements in a photosensor array could be provided with light beams having central wavelengths $\lambda_c$ that differ by as little as one nanometer.

Figure 1:
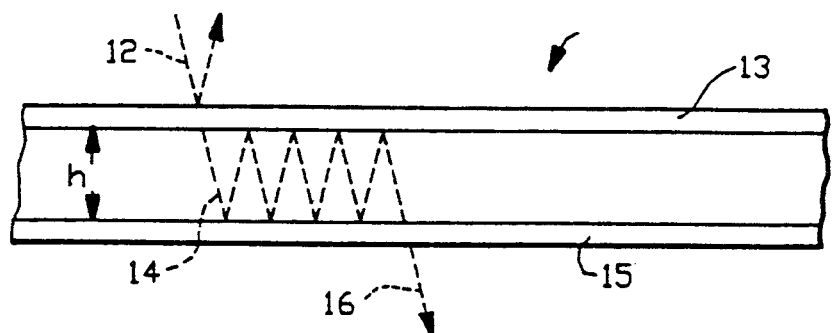
FIG. 1 is a side view of the operation of a standard Fabry-Perot etalon that receives an incident light beam.
Figure 2:
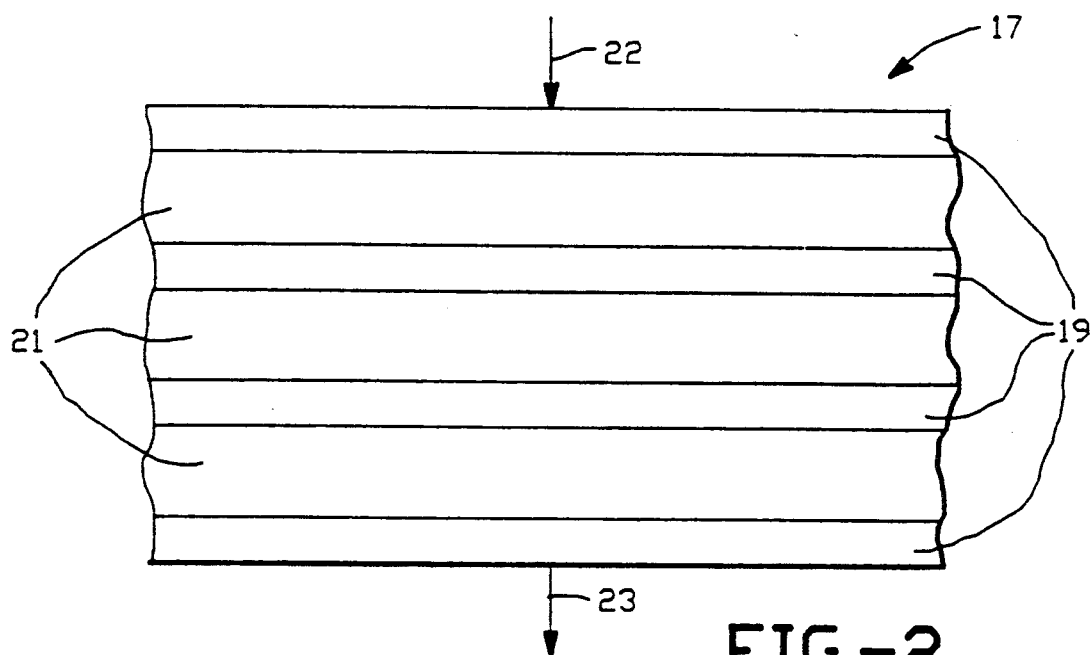
FIG. 2 is a side view of a conventional multilayer edge filter that receives an incident light beam.

Consider two Fabry-Perot etalons similar to the etalon in FIG. 1, each with a pair of parallel reflecting surfaces, positioned to serially receive and transmit an incident light beam. McLeod, *Thin-Film Optical Filters*, op.cit., pages 158-160, in his treatise shows that the transmittance $T_i$ for each of these etalons is given by $$T_i = \frac{T_i(\max)}{1 + F_i \sin^2 \delta_i} \qquad (9)$$

$$\delta_i = 2\pi n_i h_i \cos \Theta_i / \lambda \qquad (10)$$

where $F_i$, $n_i$, $h_i$ and $\Theta_i$ are the finesse, refractive index, reflector spacing and incidence angle for etalon no. i (i=1,2). Etalon no. i has maximum transmission when $\delta_i = M_i \pi$, where $M_i$ is a positive integer. If each of the two etalons has maximum transmittance for the same particular wavelength $\lambda_M$, this requires that $$\delta_i = \frac{2\pi n_i h_i \cos \Theta_i}{\lambda_M} = M_i \pi (i = 1,2), \qquad (11)$$

If these two etalons represent a composite narrow pass band filter and a broad band pass filter, ideally the two filters would have a coincident maximum only for the single wavelength $\lambda = \lambda_M$. In fact, the two etalons have a sequence of coincidence wavelengths for which the transmittance is a maximum for both etalons, namely $$\lambda = \lambda_k = \frac{\lambda_M}{k/(M_1,M_2)} = \frac{(M_1,M_2)\lambda_M}{k}, \qquad (12)$$

$$(k = 1,2,3, \ldots)$$

where $(M_1,M_2)$ is the greatest common integer divisor of the integers $M_1$ and $M_2$ For example, $(2,3)=1$ and $(30,42)=6$. From Eq. (12) it is clear that, in order to position the coincidence wavelength $\lambda_k (\neq \lambda_M)$ nearest to $\lambda_M$ for which $T_i$ and $T_2$ are both maximal, as far as possible from $\lambda_M$, the integers $M_1$ and $M_2$ should be chosen to be relatively prime to one another so that $(M_1, M_2)=1$. For example, $(M_1,M_2)=1$ if $M_1$ (or $M_2$) = 1 or if $M_1$ is a prime number p at least equal to 2 and $M_2$ is an integer that is not divisible by p. For a choice of integers $M_1$ and $M_2$ for which $(M_1,M_2)=1$, the coincidence wavelengths $\lambda_k$ for which the transmittances $T_1$ and $T_2$ are both maximal then become $\lambda_k = \lambda_M/k$, and $\lambda_1 = \lambda_M$, $\lambda_2 = \lambda_M/2$, and no other coincidence wavelength $\lambda_k$ is closer to the desired wavelength $\lambda_M$ than $\lambda_2$, which is displaced a distance $\lambda_M/2$ from the desired value; and no coincidence occurs at a wavelength $\lambda_k > \lambda_M$. However, if $(M_1,M_2) = q \geq 2$, the coincidence wavelengths $\lambda_k = q\lambda_M/k$ for $k < q$ are coincidence wavelengths that lie above the desired wavelength $\lambda_M$ and $\lambda_{q+1} = q\lambda_M/(q+1)$ lies below $\lambda_M$ and at a distance $\lambda_M/(q+1) \leq \lambda_M/3$ from the desired wavelength $\lambda_M$. Thus, the maximum spacing of $\lambda_M$ from its nearest neighbor coincidence wavelength (one of the $\lambda_k$) occurs when the two integers $M_1$ and $M_2$ are relatively prime to one another so that $(M_1,M_2)=1$.

As an example of this, FIGS. 24A, 24B, 24C and 24D illustrate the transmittances as a function of wavelength and the proximity of transmittance maxima for four single optical cavity filters or etalons with filter thicknesses h=180.67 nm, 722.70 nm, 361.35 nm and 549.25 nm, respectively. For each of the four cavities, the finesse is F=19.30, the refractive index is n=1.52 and the incidence angle is $\Theta = 0$. Comparing FIGS. 24A and 24B, one notes that these two filters have a coincidence wavelength at $\lambda = \lambda_M = 549.25$ nm for the respective orders, m=1 (24A) and m=4 (24B) and have a second (nearest neighbor) coincidence wavelength at $\lambda = \lambda_M/2 = 274.6$ nm for the respective orders m=2 and m=8. The two transmittance peaks in FIG. 24A for m=1 and m=2 are much broader than the corresponding transmittance peaks in FIG. 24B for m=4 and m=8, respectively. Comparing FIGS. 24C and 24D, one notes that these two filters have a coincidence wavelength at $\lambda = \lambda_M = 549.25$ nm for the respective orders m=2 and m=3 and have a second (nearest neighbor) coincidence wavelength at $\lambda = \lambda_M/2 = 274.6$ nm for the respective orders m=4 and m=6. Each of these two pairs of orders for the chosen wavelength $\lambda_M = 549.24$ nm is relatively prime in the sense that $(M_1,M_2)=(1,4)=1$ and $(M_1,M_2)=(2,3)=1$ so that the nearest neighbor coincidence wavelength occurs at $\lambda_2 = \lambda_M/2 = 274.2$ nm.

Figure 24A:
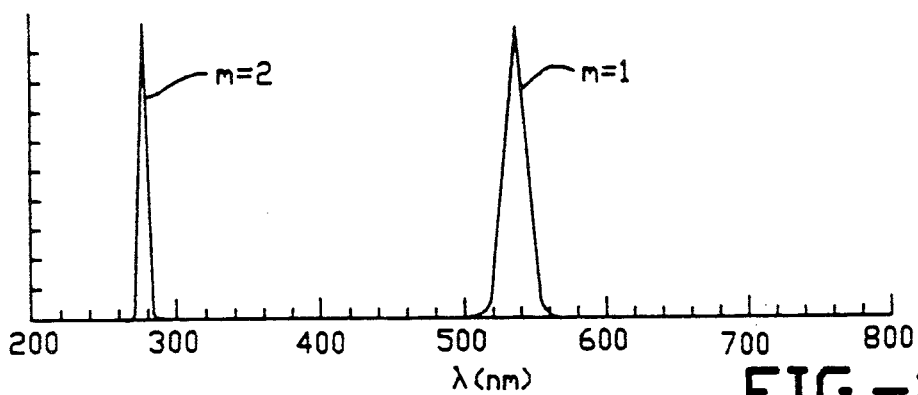
FIGS. 24A-24D are plots illustrating the proximity and coincidence of transmission maxima for an etalon-type filter for the choices of transmission orders m=1, 4, 2 and 3, respectively.
Figure 24B:
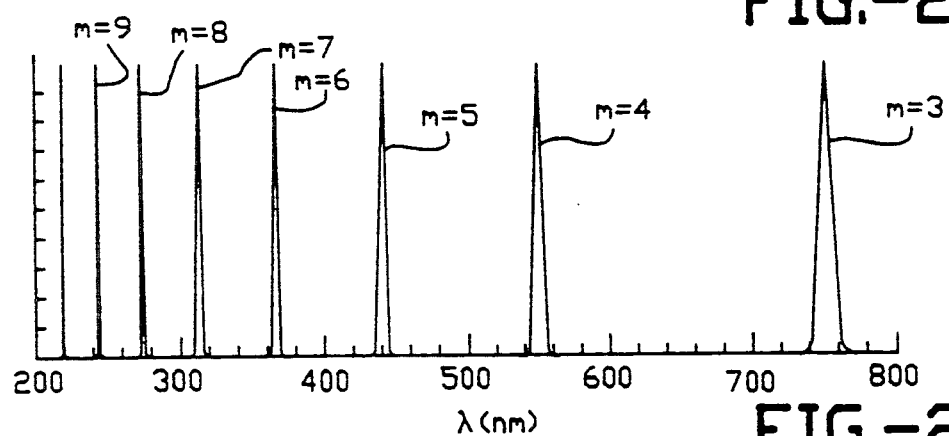
Figure 24C:
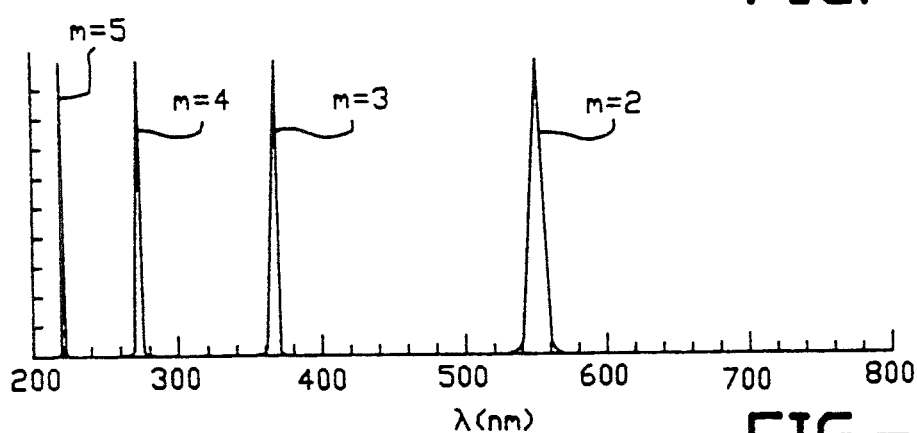
Figure 24D:
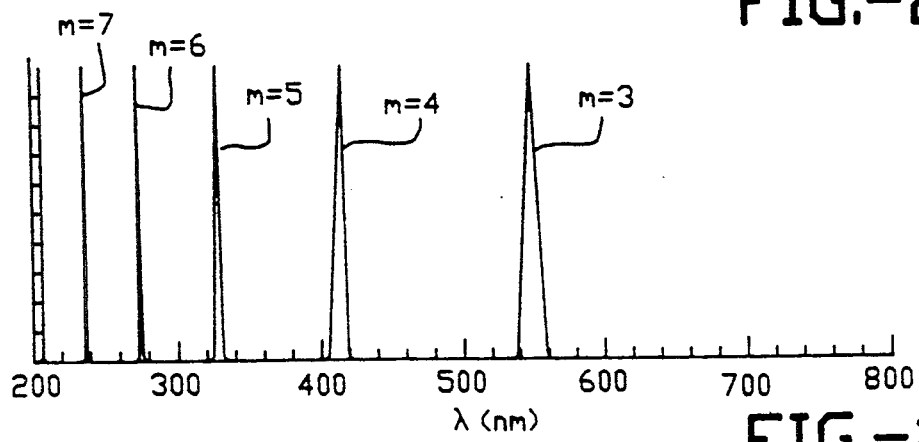

However, compare the maxima of FIGS. 24B and 24C, for which the respective orders at the wavelength $\lambda = \lambda_M = 549.25$ nm are m=4 and m=2. The nearest neighbor coincidence wavelength for these two filters occurs at $\lambda = (2/3)\lambda_M = 366.33$ nm, where the order m=6 maxima for the second filter (FIG. 24B) coincides with the order m=3 maxima for the third filter (FIG. 24C). This produces a nearest neighbor coincidence wavelength that is closer to the desired wavelength $\lambda_M = 549.25$ nm than is the coincidence wavelength $\lambda = \lambda_M/2 = 274.6$ nm. This is undesirable, and it arises from the fact that the orders m=4 (FIG. 24B) and m=2 (FIG. 24C) for the desired wavelength are not relatively prime: $(4,2)=2$.

In choosing the orders $M_1$ and $M_2$ for the desired common wavelength $\lambda_M$ with maximum transmittance for a composite first band pass filter and second band pass filter, it is thus preferable to choose the integers $M_1$ and $M_2$ relatively prime to one another. One choice that insures this is $M_1=1$ or $M_2=1$ or both. The choice $M_1 = M_2 = 1$ produces a double cavity, a serial arrangement of two substantially identical filters that produces a narrow or central pass band than either filter by itself, but at a cost of reduced transmission. If the maximum transmission of a pass band filter is, say, 0.8, a serial arrangement of N identical filters will have a maximum transmission of $(0.8)^N$. Another suitable choice is $M_1 = 1$ and $M_2 = 2, 3, 4$ or higher. This latter choice might be made where filter no. 1 is a broad band filter and filter no. 2 is a narrow band filter. The broad pass band filter should have a central wavelength that coincides with the central wavelength $\lambda_c$ of the narrow pass band filter. The broad band pass filter will suppress the side bands or fringes associated with the narrow pass band filter, and the narrow pass band filter can then provide a single, narrow, sharply defined wavelength peak at $\lambda = \lambda_c$ for the serial combination of these two filters.

If a narrow band pass filter and a broad band pass filter are positioned on a substrate of nominally constant thickness, the two filters may be placed on separate, spaced apart, opposed surfaces. Preferably, however, these two filters should be placed on the same surface of such a substrate, or sufficiently separated on different substrates, to prevent "leakage" therethrough of light in an undesired pass band arising from internal reflections at non-zero incidence angles within the intervening substrate(s).

The different embodiments of the light filter/photosensor array disclosed above may be used in a variety of applications, including analytical spectroscopy, colorimetry, photometry and radiometry. Analytical spectrophotometers and some colorimeters employ a built-in source of illumination whose effect must be removed or compensated for in the output signal in order to produce a correct reading of the sample illuminated by that source. Accurate wavelength measurement requires frequent calibration of the light source. This is most easily accomplished by measuring the spectral response of the source, using the spectrophotometer output signal and digitally storing the measured values in a calibration look-up table (LUT). Upon subsequent spectral measurement of a sample, both the spectrophotometer signals and the source calibration values for each photosensor element are used to correct the photosensor output signal. Each photosensor element may have an independent gain factor G, which may be less than one, equal to one and greater than one, applied multiplicatively to the electrical output signal of the photosensor, in order to vary the output signal according to a central wavelength $\lambda_c$ of the narrow band of wavelengths received by that photosensor. This will allow wavelength-by-wavelength correction for the source of light that arrives at the filter 153 in FIG. 17 and will further allow practice of wavelength-selective spectroscopy. A spectrophotometer or colorimeter, constructed according to any of the embodiments of the invention, will cause a variation in the peak wavelength in a selected direction along the filter, and each photosensor element can be calibrated separately to remove or compensate for the effects of the illumination source.

Colorimeters and some photometers require use of additional filtering such as the CIE X/Y/Z color matching filters used in colorimeters. These filter functions are easily stored in memory and applied to produce an electrical output signal, having a value that corresponds to an optical filter function as a function of wavelength or of the position of a photosensor element in an array of such elements. Where the invention is used with a colorimeter, the signal stream is applied separately to each of three filters, producing three output signals that have maxima in different wavelength regions in a manner well known in the art.

The compact size of a fully integrated package incorporating the invention allows substantial miniaturization thereof and allows construction of portable instrumentation. One unique application of the spectrophotometer is for an on-board colorimeter for monitoring color printing and display screens for computers and television receivers. Other applications that use the small size of the invention to advantage are in the construction of hand-held spectrophotometers, colorimeters and radiometers for remote measurement of chemical and medical processes, ad a hand-held computer peripheral for color measurement or control and analysis of the display on a computer monitor. A chemical or medical process could be monitored in situ in real time, using a miniaturized spectrophotometer or similar device that incorporates the invention.

Another application of the invention is to construction of a colorimeter with arbitrarily prescribed electronic filters included for the color description chosen. This color description can be prescribed in terms of R/G/B or C/Y/M or X/Y/Z or any other appropriate multiple-parameter description of the color content of a light signal.

Figure 25:
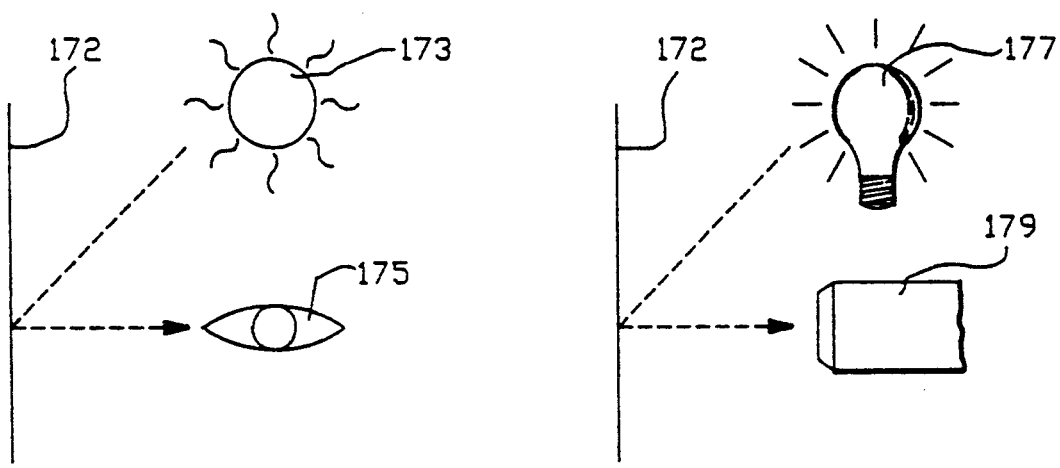
FIG. 25 is a schematic view illustrating a suitable approach to match a color pattern received by an eye from an object and a color pattern received by a photosensor from the object illuminated by an arbitrary source.

One model used to analyze colorimeter performance is illustrated in FIG. 25. Tri-stimulus X/Y/Z values, used for measuring the eye's response to an object 172 that is illuminated by a known light source 173 and received by an eye 175, are computed using the CIE 1931 color matching functions. For non-luminous objects, the colorimeter measures each object 172 under the illumination of an appended lamp 177 that has a spectral distribution that differs from the ambient light. In order to match the tri-stimulus response of the eye 175, the spectral distribution measured by a photosensor 179 must be corrected through calibration to include the spectral distribution of the ambient source 177 and to remove or compensate for illumination produced by the lamp 177. Once this correction is made the resulting signal is convolved with the CIE 1931 x, y, z Color Matching Functions (or their current equivalents) to produce X, Y, Z tri-stimulus values of the measured object. The color difference between the response of the eye 175 and the response of the colorimeter including the photosensor 179 can be computed using the 1976 CIE LUV color difference equations or using other suitable colorimetric difference algorithms.

Another application of the invention is to construction of a photometer or a luminometer, including an electronic wavelength filter that is preset to a desired luminosity curve.

Another application of the invention is to a reflectance spectrophotometer in which no predetermined electronic filtering is imposed on the photosensor array. This device could be used to scan any combination of infrared, visible and ultraviolet light or any self-luminous device. The invention may also be used as part of a transmission spectrophotometer in which a cell containing the sample is inserted in the path of the light beam.

Figure 26:
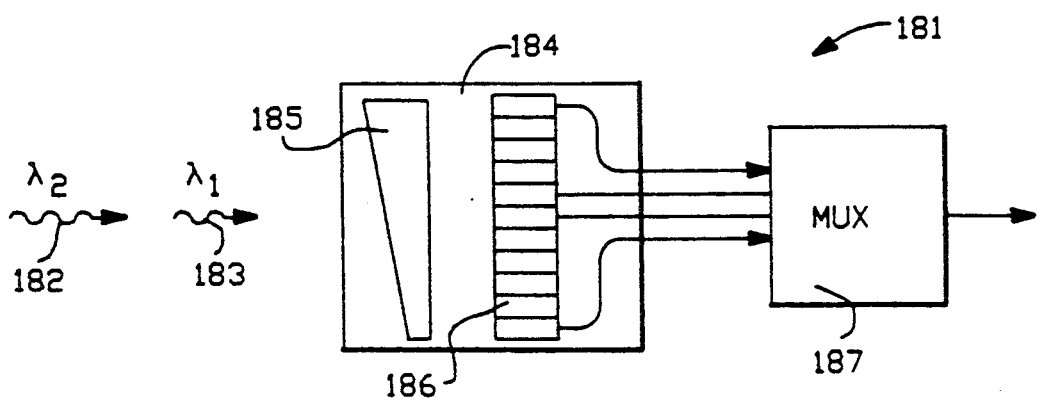
FIG. 26 is a schematic view illustrating application of the invention in a multiple channel communications receiver.

Another application of the invention is as a multiple channel communications receiver 181, as shown in FIG. 26, using an optical multiplexer with spectral separation provided by a spectrophotometer constructed according to the invention. Two or more communications signals 182 and 183 are received serially or simultaneously in time by a light filter and sensor system 184 constructed according to the invention. The system 184 includes a light filter 185 constructed according to the invention plus a photosensor array 186 that receives the filtered light that is transmitted or reflected by the light filter 185. The signals 183 and 182 are electromagnetic signals having representative, approximately monochromatic wavelengths $\lambda_1$ and $\lambda_2$, respectively, with $\lambda_1$ and $\lambda_2$ being spaced apart sufficiently so that each of these signals is received by a different photosensor or different group of photosensors in the array 186. Electrical signals produced by each of the photosensors in the array 186 are periodically accepted by a multiplexer ("MUX") 187 (optional), with the signal from photosensors that receive the two communication signals 182 and 183 being produced as MUX output signals during non-overlapping time intervals. The temporally non-overlapping output signals from the MUX 187 may then be separately processed, if desired. Theoretically, a photosensor array 186 with 200 sensors could provide up to 200 separate communication channels. In practice, groups of adjacent photosensors might be used for each separate channel so that 20–40 different communication channels might be provided by the embodiment 181. The communication signals themselves might use ultraviolet, visible or infrared wavelengths or combinations of these wavelength ranges. The communications receiver can also be operated without the multiplexer 187 because light with wavelengths corresponding to two or more channels can be received simultaneously by the corresponding photosensors. Thus, information on two or more wavelength channels can be received and separated simultaneously.

Figure 27:
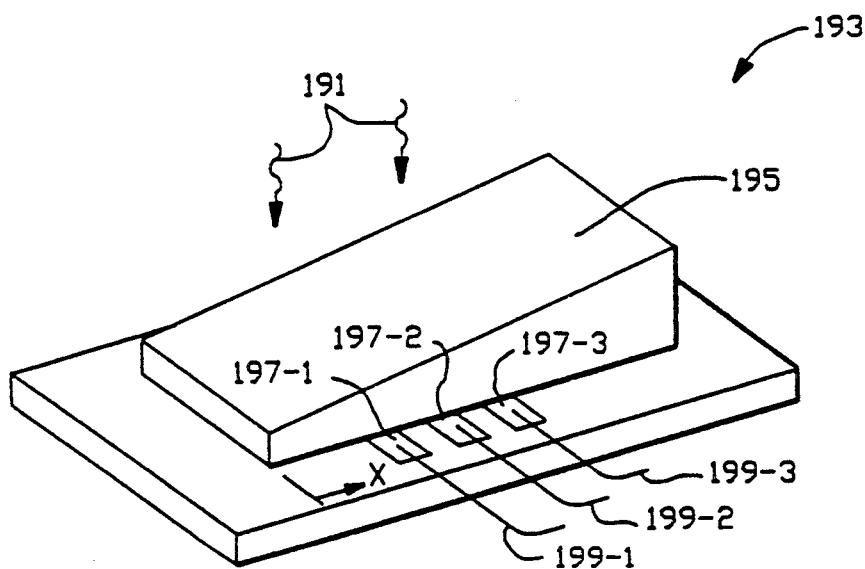
FIG. 27 is a perspective view illustrating application of the invention in a color scanner.

Another application of the invention is as a color scanner, as illustrated in FIG. 27. A light beam 191, having a plurality of different wavelengths λ, arrives at a spectrophotometer or colorimeter 193 constructed according to the invention. The light beam 191 is received by an elongated light filter 195, constructed according to the invention, and is decomposed spectrally by the light filter into a sequence of photosensor rows, with each row corresponding to a different central wavelength. The spectrally decomposed light is received by a photosensor array that includes three or more rows 197-1, 197-2 and 197-3 of photosensor elements, with each such row analyzing a wavelength range centered at a different central wavelength $\lambda_{c1}$, $\lambda_{c2}$ and $\lambda_{c3}$, respectively. These wavelength ranges may partly overlap or may be completely separated. The light filter 195 may illuminate all photosensor rows simultaneously, or the light issuing from the light filter may illuminate the photosensor rows one by one by sweeping this light serially across each such row. The electrical signals produced by the photosensors in each row 197-1, 197-2 and 197-3 represent the wavelengths present in a selected portion of the ultraviolet, visible or infrared wavelength region contained in the incident light beam 191. The electrical signals from each row 197-1, 197-2 and 197-3 may be sent out on separate output signal lines 199-1, 199-2 and 199-3, respectively, or these signals may be multiplexed on a single line using a multiplexer similar to the MUX arrangement shown in FIG. 26.

The light filter itself may be used as a light monochrometer by deleting the photosensor array 155 shown in FIGS. 17 and 18. The light filter spectrally decomposes the incident light beam 157, and a small sector of light that issues from the light filter will be approximately monochromatic.

Figure 28:
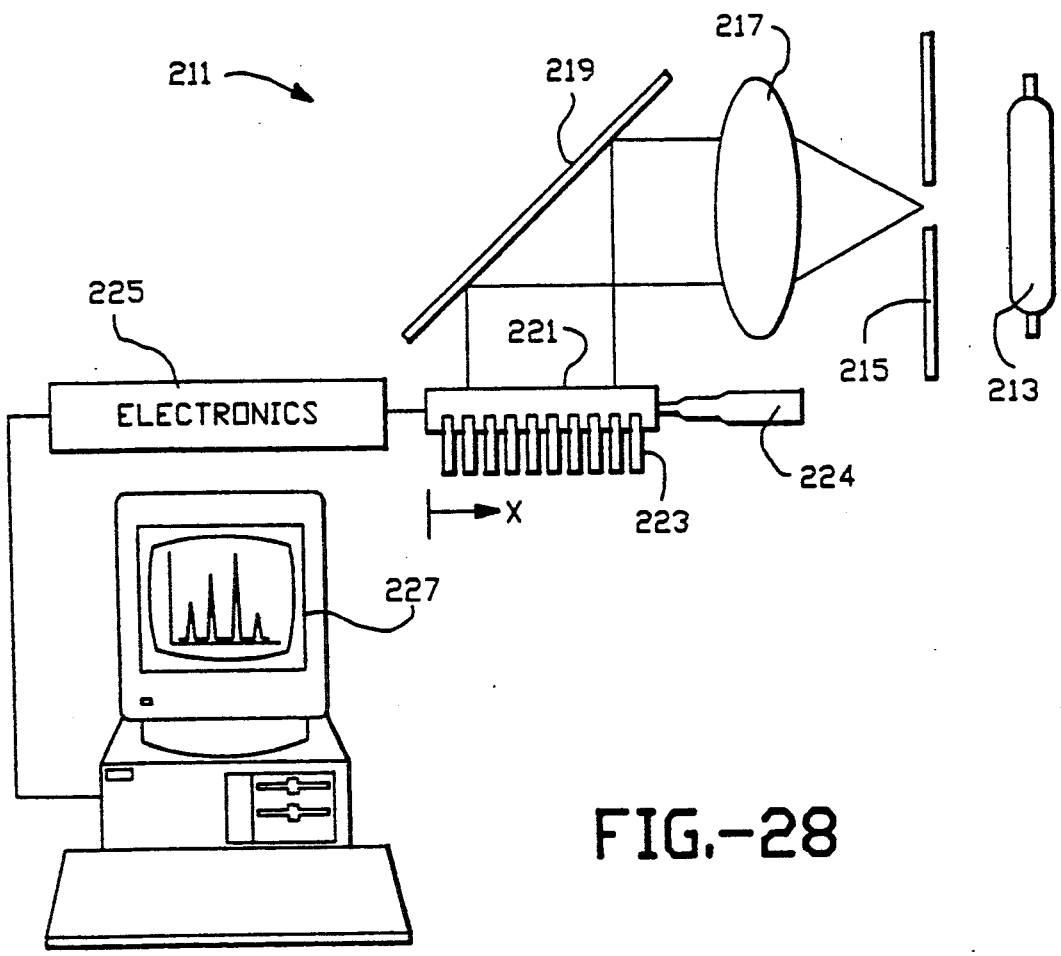
FIG. 28 is a schematic view of a prototype of the invention that has been constructed and operated.
Figure 29:
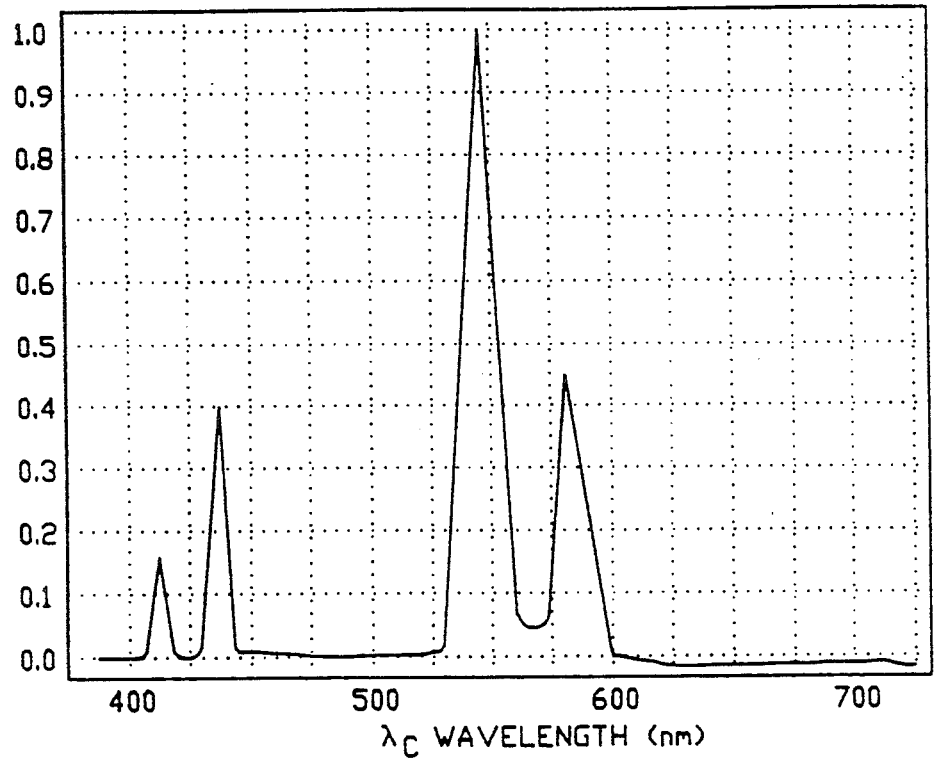
FIG. 29 is a plot of transmittance, as a function of the central wavelength of each of a linear array of photosensors, produced by the prototype in FIG. 28.

FIG. 28 illustrates schematically a working prototype of one embodiment of the filter 211 of the invention, in which light from a Hg vapor lamp 213, with characteristic peak emissions at wavelengths λ=409, 436, 546 and 578 nm, is passed through an iris or slit 215, through a lens 217 and is reflected by a mirror 219 toward a variable wavelength filter 221 constructed according to the invention. The particular filter 221 here has a narrow band pass filter and a broad band pass filter that are each constructed using a wedge with two planar reflecting surfaces as part of the variable thickness filter. The light transmitted at each spatial position x along the filter 221 lies in a narrow band of wavelengths whose FWHM ranges from 6 to 14 nm in one embodiment, and the transmitted light is received by a linear array 223 of photosensors that are processed by an electronics module 225. A longitudinal translation screw 224 is optionally provided to allow adjustment of the relative position of the filter 221 and the photosensor array 223. The light intensity I(λ; x) received at each photosensor in the linear array 223 may be displayed on a CRT or other display module 227 as a function of central wavelength $\lambda_c$ (or variable position x) for each of a linear array of photosensors, as shown in FIG. 29.

Electronics for controlling photosensor arrays and for digitizing their output signals are well known and commercially available. The circuits control the time and rate of exposure, collect and serially shift out the charge generated by each respective photoelement, then amplify and digitize the signal stream.

Figure 30:
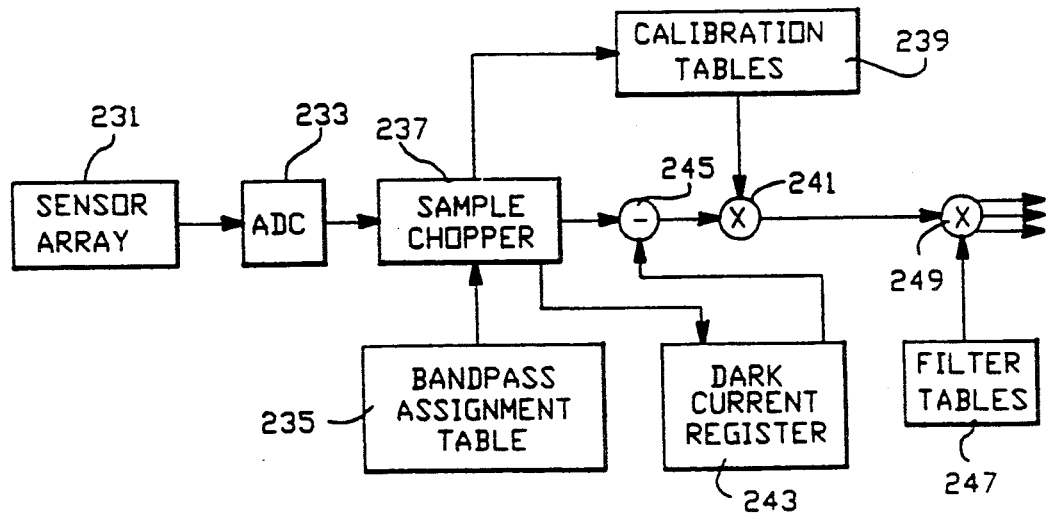
FIG. 30 is a schematic view of an electrical circuit that is suitable for processing the output signals from a photosensor array.

Alignment of the variable wavelength filter and photosensor array may be controlled through electronic measurement and signal processing. By exposing the spectrophotometer to a monochromatic source of known wavelength, the output signal from the photosensor 231 shown in FIG. 30 will indicate the particular photoelement along the array that has been aligned with the filter for that wavelength. Additional measurements at different wavelengths can be used to identify the exact filter gradient, if unknown, to determine the number of active elements covering a given spectral range. The process is facilitated by providing for additional, and therefore unused, photoelements along the array. The additional elements provide a margin for manufacturing and assembly tolerances of the photosensor and filter. In FIG. 30, the identity of each photoelement with a particular spectral band or wavelength can be stored in digital memory as a bandpass assignment look up table (LUT) 235. The signal provided by the unused, and therefore unassigned, elements at the ends of the array are "chopped" (discarded) from the signal stream by a sample chopper 237.

The digitized signals from the sensor typically have errors due to photoresponse non-uniformities along the array. Non-uniformities arise from element photoresponse variation, wavelength dependent responsivity, bandpass shape and transmittance variation along the filter, and non-uniformities in the optics. These device dependent errors can be compensated for by calibration. Through measurement, a calibration factor for each photoelement is computed to correct the spectrophotometer response to a known source, e.g. a black body radiator. The factors are digitally stored in a calibration LUT 239 and sequentially applied by a multiplier module 241 to the output of the spectrophotometer upon all subsequent readings. Sequencing is controlled in coordination with the sample chopper 237 to assure that each calibration factor is applied to the signal of the appropriate photoelement. A dark current register 243 receives and stores digitized dark current signals, provided by an ADC 233 through which the sensor signals pass, for each of the active photosensors in the array 231 and substracts these values, sensor-by-sensor, from the electrical output signal from the sample chopper 237 by means of a subtractor module 245. Filter tables 247 are optionally provided for color compensation or color comparison purposes, using another multiplier module 249.

The preceding discussion has covered several configurations, and it is worthwhile to indicate the problems and advantages associated with each configuration. All optical cavities discussed here are assumed to provide a central wavelength $\lambda_c$ that varies with position ("variable wavelength filter") unless indicated otherwise. A single cavity narrow band filter provides no means to suppress the undesirable fringes that occur. This may require use of a low etalon order (m=1 or 2) for transmission in order to keep these fringes as far from the fundamental or desired pass band as possible. Use of a low etalon order will produce a wider so-called narrow band: the FWHM of such a band becomes narrower as the central wavelength decreases, corresponding to increasing order.

Use of a double cavity or compound narrow band filter, such as a combination of two Fabry-Perot etalons or edge filters positioned to serially receive the light beam, produces a narrower band than the single cavity arrangement but suffers from lower total transmission. These features are also present in a composite filter consisting of a single cavity narrow band filter plus a single cavity wide band filter and requires care in alignment of the variable central wavelength $\lambda_c$ of each cavity.

A combination of a double cavity narrow band filter plus a wide band filter will allow more tolerance in alignment of the variable central wavelength $\lambda_c$ and will produce a narrow band output signal at any position.

Use of a narrow band edge filter, or Fabry-Perot etalon with spacer together with a Fabry-Perot reflector, both narrow band, will provide a narrow, almost rectangular pass band with relatively high transmission. Adding a wide band filter to this configuration will produce similar results, but the central wavelength alignment problem is present here. Replacing this wide band filter by a variable wavelength wide band filter will also provide a narrow, almost rectangular pass band with high transmission, and higher etalon orders may be used to further steepen the rise and fall of the pass band.

I claim:

1. Light filter apparatus having a band pass with a central wavelength for light that varies with displacement of position in a selected spatial direction in a light-receiving surface of a filter, the apparatus comprising:
   a first stratum of filter material, having first and second spaced apart, light-receiving surfaces facing each other, that is partly transmitting and partly reflecting for light received at a light-receiving surface thereof and having a wavelength in a selected pass band of wavelengths, where a distance of separation h(x) of the two surfaces increases monotonically with displacement of a position coordinate x in the selected direction, and for at least one position the distance of separation is approximately equal to $m\lambda_c/2n$, where m is a positive integer and n is the real part of the refractive index of the filter material for light of a selected wavelength $\lambda_c$ in the selected pass band; and
   a second stratum of filter material, having first and second, spaced apart, light-receiving surfaces facing each other with a distance of separation that varies with displacement of position in the selected direction, that is at least partly transmitting for light having the wavelength $\lambda_c$, that is substantially fully absorbing or reflecting for light having a second wavelength approximately equal to a wavelength of any transmittance side band of the first stratum of filter material, and that is positioned so that light issued from one of the first stratum and the second stratum is received by the other stratum.

2. Light filter apparatus having a band pass with a central wavelength for light that varies with displacement of position in a selected spatial direction in a light-receiving surface of a filter, the apparatus comprising:
   a first stratum of filter material, having first and second spaced apart, light-receiving surfaces facing each other, that is partly transmitting and partly reflecting for light received at a light-receiving surface thereof and having a wavelength in a selected pass band of wavelengths, where a distance of separation h(x) of the two surfaces increases monotonically with displacement of a position coordinate x in the selected direction, and for at least one position the distance of separation is approximately equal to $(m-\frac{1}{2})\lambda_c/2n$, where m is a positive integer and n is the real part of the refractive index of the filter material for light of a selected wavelength $\lambda_c$ in the selected pass band; and
   a second stratum of filter material, having first and second, spaced apart, light-receiving surfaces facing each other with a distance of separation that varies with displacement of position in the selected direction, that is at least partly transmitting for light having the wavelength $\lambda_c$, that is substantially fully absorbing or transmitting for light having a second wavelength approximately equal to a wavelength of any reflectance side band of the first stratum of filter material, and that is positioned so that light issued from one of the first stratum and the second stratum is received by the other stratum.

3. Light filter apparatus having a band pass with a central wavelength for light that varies with displacement of position in a selected spatial direction in a light-receiving surface of a filter, the apparatus comprising:
   a first stratum of filter material, having first and second spaced apart, light-receiving surfaces facing each other, that is partly transmitting and partly reflecting for light received at a light-receiving surface thereof and having a wavelength in a selected pass band of wavelengths, where a distance of separation h(x) of the two surfaces increases monotonically with displacement of a position coordinate x in the selected direction, and for at least one position the distance of separation is approximately equal to $m\lambda_c/2n$, where m is a positive integer and n is the real part of the refractive index of the filter material for light of a selected wavelength $\lambda_c$ in the selected pass band; and
   a second stratum of filter material, having first and second, spaced apart, light-receiving surfaces facing each other with a distance of separation that varies with displacement of position in the selected direction, that is at least partly transmitting for light having the wavelength $\lambda_c$, that is substantially fully absorbing or reflecting for light having a second wavelength approximately equal to a wavelength of any transmittance side band of the first stratum of filter material, and that is positioned so that light issued from one of the first stratum and the second stratum is received by the other stratum.

4. Light filter apparatus having a band pass with a central wavelength for light that varies with displacement of position in a selected spatial direction in a light-receiving surface of a filter, the apparatus comprising:
   a first stratum of filter material, having first and second spaced apart, light-receiving surfaces facing each other, that is partly transmitting and partly reflecting for light received at a light-receiving surface thereof and having a wavelength in a selected pass band of wavelengths, where a distance of separation h(x) of the two surfaces increases monotonically with displacement of a position coordinate x in the selected direction, and for at least one position the distance of separation is approximately equal to $(m-\frac{1}{2})\lambda_c/2n$, where m is a positive integer and n is the real part of the refractive index of the filter material for light of a selected wavelength $\lambda_c$ in the selected pass band; and a second stratum of filter material, having first and second, spaced apart, light-receiving surfaces facing each other with a distance of separation that varies with displacement of position in the selected direction, that is at least partly transmitting for light having the wavelength $\lambda_c$, that is substantially fully absorbing or transmitting for light having a second wavelength approximately equal to a wavelength of any reflectance side band of the first stratum of filter material, and that is positioned so that light issued from one of the first stratum and the second stratum is received by the other stratum.

5. The apparatus of claim 1, 2, 3 or 4, wherein said second stratum of filter material is substantially fully absorbing or transmitting for light having a wavelength $\lambda = \lambda_c + \Delta\lambda$ with $|\Delta\lambda|/\lambda_c > 0.5$.

6. The apparatus of claim 1, 2, 3 or 4, wherein said selected wavelength $\lambda_c$ is equal to a predetermined wavelength $\lambda_1$, and further comprising
means for isolating or redirecting an approximately monochromatic portion of the beam of light issued by said light filter that has a wavelength approximately equal to $\lambda_1$.

7. The apparatus of claim 1, 2, 3 or 4, wherein said integer m is at least equal to two.

8. The apparatus of claim 1, 2, 3 or 4, wherein said second filter stratum is drawn from the class of materials consisting of magnesium fluoride, zinc sulfide, calcite, sapphire, aluminum, and oxides of silicon, germanium, calcium, cadmium, aluminum, titanium, cerium and zirconium.

9. The apparatus of claim 1, 2, 3 or 4, wherein said first stratum is drawn from the class of material consisting of magnesium fluoride, zinc sulfide, calcite, sapphire, aluminum, and oxides of silicon, germanium, calcium, cadmium, aluminum, titanium, cerium and zirconium.

10. The apparatus of claim 1, 2, 3 or 4, wherein said distance of separation of said two surfaces of said first filter stratum changes continuously with displacement of position in said selected spatial direction; and
wherein said first of said two surfaces of said second stratum has a staircase configuration with two or more staircase segment planes that are spaced apart from and approximately parallel to said second surface of said second stratum.

11. The apparatus of claim 1, 2, 3 or 4, wherein said first surface of said first stratum has a staircase configuration with two or more staircase segment planes that are spaced apart from and approximately parallel to said second surface of said first stratum; and
wherein said distance of separation of said two surfaces of said second stratum changes continuously with displacement of position in said selected direction.

12. The apparatus of claim 1, 2, 3 or 4, wherein said first surface of said first stratum has a staircase configuration with two or more staircase segment planes that are spaced apart from and approximately parallel to said second surface of said first stratum; and
wherein said first and second surfaces of said second stratum each have a staircase configuration, with two or more staircase segment planes of said first surface being spaced apart from and approximately parallel to two or more staircase segment planes of said second surface.

13. The apparatus of claim 1, 2, 3 or 4, wherein said first and second surfaces of said first stratum each have a staircase configuration, with two or more staircase segment planes of said first surface being spaced apart from and approximately parallel to two or more staircase segment planes of said second surface; and
said first surface of said second stratum has a staircase configuration with two or more staircase segment planes that are spaced apart from and approximately parallel to said second surface of said second stratum.

14. The apparatus of claim 1, 2, 3 or 4, further comprising an optically transmitting substrate, having at least two opposed light-receiving surfaces, positioned between said first stratum and said second stratum, with at least one of said first and second strata being positioned on a surface of the substrate.

15. The apparatus of claim 1, 2, 3 or 4, further comprising an optically transmitting substrate, having at least two opposed light-receiving surfaces, with said first filter stratum and said second stratum being positioned adjacent to each other on the same light-receiving surface of the substrate.

16. The apparatus of claim 1, 2, 3 or 4, further comprising a substrate, having at least two opposed light-receiving surfaces, that contains a material that is substantially fully absorbing for light having a wavelength that lies outside said selected pass band of wavelengths.

17. The apparatus of claim 1, 2, 3 or 4, wherein said first stratum and said second stratum extend approximately parallel to each other in a rectilinear direction.

18. The apparatus of claim 1, 2, 3 or 4, wherein said first stratum and said second stratum lie along sectors of a first circle and a second circle, respectively, with the two circles being approximately concentric.

19. The apparatus of claim 1, 2, 3 or 4, further comprising an optically transmitting prism having at least first and second light-receiving surfaces, with said first and second strata being positioned on the first and second surfaces of the prism.

20. The apparatus of claim 1, 2, 3 or 4, wherein said distance of separation $h(x)$, as a function of said position coordinate x in said selected direction, of said two surfaces of said first stratum is approximately of the form $h(x) = a + bx^k$, where a, b and k are predetermined real constants and $k \neq 0$.

21. Light filter and sensor apparatus having a band pass with a central wavelength for transmitted light that varies with displacement of position in a selected spatial direction in a light-receiving surface of a light filter, the apparatus comprising:
a first stratum of filter material, that has two spaced apart surfaces facing each other, with one of these surfaces being positioned to receive incident light thereat, with a distance of separation $h_1(x)$ between these two surfaces that varies monotonically with increase in a position coordinate x measured in a selected direction in a light-receiving surface of the first stratum, that is highly transmitting for incident light having a wavelength $\lambda$ lying in a narrow wavelength pass band that has a pass band central wavelength $\lambda_c(x)$ at a position given by the spatial coordinate x, where $\lambda_c(x)$ varies monotonically with increase in the coordinate x;
a second stratum of filter material, positioned adjacent to one of the two surfaces of the first stratum, that has two spaced apart surfaces facing each other, with a distance of separation $h_2(x)$ between these two surfaces that varies monotonically with increase in the position coordinate x, that is highly transmitting for incident light having the wavelength $\lambda_c(x)$ at a position with coordinate x, that is substantially fully absorbing or reflecting for incident light having a wavelength approximately equal to a wavelength of any transmittance side band of the first stratum of filter material, and that is positioned so that light that issues from one of the first stratum and the second stratum is received by the other stratum; and an array of photosensors extending in the selected direction, with each photosensor being positioned to receive a portion of a light beam that is issued from the first or second stratum at a position measured in the selected direction.

22. Light filter and sensor apparatus having a band pass with a central wavelength for transmitted light that varies with displacement of position in a selected spatial direction in a light-receiving surface of a filter, the apparatus comprising:

a first stratum of filter material, that has two spaced apart surfaces facing each other, with one of these surfaces being positioned to receive incident light thereat, with a distance of separation $h_1(x)$ between these two surfaces that varies monotonically with increase in a position coordinate x measured in a selected direction in a light-receiving surface of the first stratum, that is highly transmitting for incident light having a wavelength $\lambda$ lying in a narrow wavelength pass band that has a pass band central wavelength $\lambda_c(x)$ at a position given by the spatial coordinate x, where $\lambda_c(x)$ varies monotonically with increase in the coordinate x;

a second stratum of filter material, positioned adjacent to one of the two surfaces of the first stratum, that has two spaced apart surfaces facing each other, with a distance of separation $h_2(x)$ between these two surfaces that varies monotonically with increase in the position coordinate x, that is highly transmitting for incident light having the wavelength $\lambda_c(x)$ at a position with coordinate x, that is substantially fully absorbing or reflecting for incident light having a wavelength approximately equal to a wavelength of any transmittance side band of the first stratum of filter material, and that is positioned so that light that issues from one of the first stratum and the second stratum is received by the other stratum; and an array of photosensors extending in the selected direction, with each photosensor being positioned to receive a portion of a light beam that is issued from the first or second stratum at a position measured in the selected direction.

23. The apparatus or claim 21 or 22, further comprising:

a third stratum of filter material, positioned adjacent to said first stratum, that has two spaced apart surfaces facing each other, with one of these surfaces being positioned to receive incident light thereat, and that is at least partly transmitting for incident light having a wavelength $\lambda$ lying in a narrow wavelength pass band having said central wavelength $\lambda_c(x)$ at a position given by said spatial coordinate x, where said central wavelength $\lambda_c(x)$ varies monotonically with increase in said coordinate x; and a second array of photosensors extending in said selected direction, with each photosensor in the second array being positioned to receive a portion of a light beam that is reflected from the third stratum at a position measured in said selected direction.

24. The apparatus of claim 23, wherein said third stratum has a selected band of wavelengths that includes at least one wavelength not included in said selected band of wavelengths of said first stratum.

25. Light filter and sensor apparatus according to claim 23, wherein said first photosensor array receives a portion of an incident light beam having wavelengths in a first wavelength interval $I_1$ and said second photosensor array receives a portion of the incident light beam having wavelengths in a second wavelength interval $I_2$, whereby the system can determine the energy of an incident light beam in each of two different wavelength intervals.

26. Light filter and sensor apparatus having a band pass with a central wavelength for transmitted light that varies with displacement of position in a selected spatial direction in a light-receiving surface of a filter, the apparatus comprising:

a first stratum of filter material, that has two spaced apart surfaces facing each other, with one of these surfaces being positioned to receive incident light thereat, with a distance of separation $h_1(x)$ between these two surfaces that varies monotonically with increase in a position coordinate x measured in a selected direction in a light-receiving surface of the first stratum, that is highly transmitting for incident light having a wavelength $\lambda$ lying in a narrow wavelength pass band that has a pass band central wavelength $\lambda_c(x)$ at a position given by the spatial coordinate x, where $\lambda_c(x)$ varies monotonically with increase in the coordinate x;

an array of photosensors extending in the selected direction, with each photosensor being positioned to receive a portion of a light beam that is issued from the first or second stratum at a position measured in the selected direction.

27. The apparatus of claim 26, further comprising a second stratum of filter material, positioned adjacent to one of said two surfaces of said first stratum, having two spaced apart surfaces facing each other, with a distance of separation $h_2(x)$ that increases monotonically with displacement of said position coordinate x in said selected direction, that is at least partly reflecting for light having said wavelength $\lambda_c$, that is substantially fully absorbing or transmitting for light having a second wavelength approximately equal to a wavelength of any reflectance side band of said first stratum of filter material, and that is positioned so that light issued from one of said first stratum and the second stratum is received by the other stratum.

28. The apparatus of claim 22 or 27, wherein said second stratum of filter material is substantially fully absorbing or transmitting for light having a wavelength $\lambda = \lambda_c + \Delta\lambda$ with $|\Delta\lambda|/\lambda_c > 0.5$.

29. The apparatus of claim 27, wherein said first stratum receives and reflects part of an incoming light beam at a first non-zero incidence angle, said second stratum is spaced apart from and receives a reflected light beam from said first stratum at a second non-zero incidence angle, and said photosensor array is spaced apart from and receives a reflected light beam from said second stratum.

30. The apparatus of claim 27, wherein said second stratum receives and reflects part of an incoming light beam at a first non-zero incidence angle, said first stratum is spaced apart from and receives a reflected light beam from said second stratum at a second non-zero incidence angle, and said photosensor array is spaced apart from and receives a reflected light beam from said first stratum.

31. The apparatus of claim 26, further comprising a second stratum of filter material, positioned adjacent to one of said two surfaces of said first stratum, that has two spaced apart surfaces each other with a distance of separation $h_2(x)$ that increases monotonically with displacement of said position coordinate x in said selected direction, that is at least partly transmitting for light having said wavelength $\lambda_c$, that is substantially fully absorbing or reflecting for light having a second wavelength approximately equal to a wavelength of any reflectance side band of said first stratum of filter material, and that is positioned so that light issued from one of said first stratum and second stratum is received by the other stratum.

32. The apparatus of claim 21, 22, 27 or 31, wherein said first stratum, said second stratum and said photosensor array lie along sectors of a first circle, a second circle and a third circle, respectively, with the three circles being approximately concentric.

33. The apparatus of claim 21, 22, 27 or 31, further comprising an optically transmitting prism having at least first and second light-receiving surfaces, with said first and second strata being positioned on the first and second surfaces of the prism and said photosensor array being positioned adjacent to one of said first and second strata.

34. The apparatus of claim 21, 22, 27 or 31, further comprising an optically transmitting prism having at least first, second and third light-receiving surfaces, with said first stratum, said second stratum and said photosensor array being positioned on the first, second and third surfaces, respectively, of the prism.

35. The apparatus of claim 21 or 31, wherein said second stratum of filter material is substantially fully absorbing or reflecting for light having a wavelength $\lambda = \lambda_c + \Delta\lambda$ with $|\Delta\lambda|/\lambda_c > 0.5$.

36. The apparatus of claim 21, 22, 27 or 31, wherein said second stratum of filter material is drawn from the class of materials consisting of magnesium fluoride, zinc sulfide, calcite, sapphire, aluminum, and oxides of silicon, germanium, calcium, cadmium, aluminum, titanium, cerium and zirconium.

37. The apparatus of claim 21, 22, 27 or 31, wherein said distance of separation of said two surfaces of said second stratum varies monotonically and continuously with said position coordinate x.

38. The apparatus of claim 21, 22, 27 or 31, wherein said distance of separation of said two surfaces of said second stratum is piecewise continuous in said position coordinate x.

39. The apparatus of claim 21, 22, 27 or 31, wherein said distance of separation of said two surfaces of said second stratum, denoted $h_2(x)$, varies with said position coordinate x so that $h_2(x)$ has a first constant value $H_1$ for $x_1 < x < x_2$ and has a second constant value $H_2$ for $x_3 < x < x_4$ with $x_2 \leq x_3$, where $x_1$, $x_2$, $x_3$ and $x_4$ are four values of x lying in a permitted x-range.

40. The apparatus of claim 21, 22, 27 or 31, further comprising a substrate of optically transmitting material having a surface that is partly reflecting for light having a wavelength in said selected pass band, with said first stratum and said second stratum being positioned adjacent to each other and adjacent to a substrate surface.

41. The apparatus of claim 21, 22, 27 or 31, further comprising a substrate of material having first and second opposed surfaces that are each at least partly reflecting for light having a wavelength in said selected pass band, where said first stratum and said second stratum are positioned on opposite sides of the substrate adjacent to the first and second surfaces, respectively, of the substrate.

42. The apparatus of claim 21, 22 or 26, wherein both of said spaced apart surfaces of said first stratum are planar and are oriented at a small non-zero angle relative to each other.

43. The apparatus of claim 21 or 26, wherein said first stratum and said photosensor array extend approximately parallel to each other in rectilinear direction.

44. The apparatus of claim 21, 22 or 26, wherein said first stratum and said photosensor array lie along sectors of a first circle and a second circle, respectively, with the two circles being approximately concentric.

45. The apparatus of claim 21 or 26, wherein each of said photosensors has a light-receiving face and at least two of said photosensor faces each have a corresponding linear dimension that differ from each other.

46. The apparatus of claim 21, 22 or 26, wherein said filter material is drawn from the class of materials consisting of magnesium fluoride, zinc sulfide, calcite, sapphire, aluminum, and oxides of silicon, germanium, calcium, cadmium, aluminum, titanium, cerium and zirconium.

47. The apparatus of claim 26, further comprising:
a second stratum of filter material, positioned adjacent to said first stratum, that has two spaced apart surfaces facing each other, with one of these surfaces being positioned to receive incident light thereat, and that is at least partly reflecting for incident light having a wavelength $\lambda$ lying in a narrow wavelength pass band having said central wavelength $\lambda_c(x)$ varies monotonically with increase in said coordinate x; and
a second array of photosensors extending in said selected direction, with each photosensor in the second array being positioned to receive a portion of a light beam that is reflected from the second stratum at a position measured in said selected direction.

48. The apparatus of claim 47, wherein said second stratum has a selected band of wavelengths that includes at least one wavelength not included in said selected band of said first stratum.

49. Light filter and sensor apparatus according to claim 47, wherein said first photosensor array receives a portion of an incident light beam having wavelengths in a first wavelength interval $I_1$ and said second photosensor array receives a portion of the incident light beam having wavelengths in a second wavelength interval $I_2$, whereby the system can determine the energy of an incident light beam in each of two different wavelength intervals.

50. The apparatus of claim 21 or 26, further comprising a collimator positioned between a light source and said light-receiving plane to receive and collimate a light beam from the light source before the light beam reaches said light-receiving plane.

51. The apparatus of claim 21 or 26, further comprising light distribution means for receiving a light beam, for altering the light intensity spatial distribution of the light beam and for issuing the light beam so that the light intensity spatial distribution for light received at said light-receiving plane is more uniform along said selected direction.

52. The apparatus of claim 21 or 26, further comprising light distribution means for receiving a light beam, for altering the light intensity spatial distribution of the light beam and for issuing the light beam so that the light intensity spatial distribution for light received at said light-receiving plane is increased near one end of said photosensor array.

53. The apparatus of claim 21 or 26, further comprising a lens positioned so that said first stratum lies between the lens and said photosensor array to focus an incident light beam on said first stratum.

54. The apparatus of claim 21 or 26, further comprising a lens positioned between said first stratum and said photosensor array to focus light issuing from said first stratum on said photosensor array.

55. Light filter and sensor apparatus according to claim 21, 22 or 26, wherein said photosensor array has at least first and second photosensors that receive first and second portions, respectively, of an incident light beam that has issued from said first stratum, and the first and second photosensors have first and second central wavelengths $\lambda_1$ and $\lambda_2$, respectively, and the first photosensor or the second photosensor produces an electrical output signal when the first photosensor or the second photosensor, respectively, receives a portion of an incident light beam from said first stratum,
whereby the apparatus can receive and sense at least two electromagnetic signals, each having a different wavelength.

56. The apparatus of claim 55, further comprising:
an electrical signal multiplexer having first and second input terminals to receive said first and second photosensor output signals, respectively, and having an output terminal to alternatingly issue, as an output signal thereat, the input signal received at the first input terminal or at the second input terminal.

57. The apparatus of claim 21 or 26, wherein each photosensor in said array of photosensors has a photosensor element with an output terminal at which an electrical signal appears in response to receipt of a light at the photosensor element.

58. The apparatus of claim 57, wherein said electrical output signal appearing at each of said photosensor elements has a gain factor applied thereto, and two or more of these gain factors have different values, corresponding to a predetermined pattern of such gain factors.

59. The apparatus of claim 58, further comprising wavelength accumulation means for receiving said electrical output signals from said photosensor elements and for determining the sum of the amount of light received at two or more of said photosensor elements.

60. The apparatus of claim 57, further comprising wavelength analysis means for receiving said electrical output signals from said photosensor elements and for determining the relative amounts of light received in the interval of wavelengths received by each of two or more of said photosensor elements.

61. The apparatus of claim 57, further comprising wavelength accumulation means for receiving said electrical output signals from said photosensor elements and for determining the sum of the amount of light received at two or more of said photosensor elements.

62. Light filter apparatus having a band pass with a central wavelength for transmitted light that varies continuously with displacement of position in a selected spatial direction in a light-receiving surface of a filter, the apparatus comprising:
a first edge filter that is approximately fully transmitting for incident light of wavelength equal to a selected central wavelength $\lambda_c$ and that is substantially non-transmitting for incident light having a wavelength $\lambda = \lambda_c + \Delta\lambda_1$, with $\Delta\lambda/\lambda_c > 0.1$;
a second edge filter that is approximately fully transmitting for incident light of wavelength $\lambda_c$ and that is substantially non-transmitting for incident light of wavelength $\lambda = \lambda_c - \Delta\lambda_2$ with $\Delta\lambda_2/\lambda_c > 0.1$, where the wavelength $\lambda_c$ increases monotonically with displacement of position in said selected spatial direction;
a band pass filter stratum, positioned adjacent to at least one of the first edge filter and the second edge filter, that is approximately fully transmitting for incident light of wavelength $\lambda_c$ and that is substantially non-transmitting for light of wavelength $\lambda = \lambda_c + \Delta\lambda_3$ with $|\Delta\lambda_3/\lambda_c| > 0.5$, where the first and second edge filters and the band pass filter stratum are positioned to serially receive and transmit a portion of an incident light beam.

63. The apparatus of claim 62, wherein each of said first edge filter and said second edge filter has two spaced apart filters that face each other, and a distance of separation of the two spaced apart surfaces of each edge filter increases monotonically with displacement of said position in said selected direction, and said first edge filter and said second edge filter have positions for which the distances of separation are equal to $m_1\lambda_c/2n_1$ and $m_2\lambda_c/2n_2$, respectively, where $m_1$ and $m_2$ are positive integers and $n_1$ and $n_2$ are the real parts of refractive indices of materials in said first edge filter and said second edge filter, respectively.

64. The apparatus of claim 62, further comprising an array of photosensors extending in said selected direction, with each photosensor being positioned to receive a portion of a light beam that is transmitted serially through said first and second edge filters and said band pass filter stratum at a position measured in said selected direction.

65. The apparatus of claim 62, wherein each of said first edge filter and said second edge filter has two spaced apart filters that face each other, and a distance of separation of the two spaced apart surfaces of each edge filter increases monotonically with displacement of said position in said selected direction, and said first edge filter and said second edge filter have positions for which the distances of separation are equal to $(m_1 - \frac{1}{2})\lambda_c/2n_1$ and $(m_2 - \frac{1}{2})\lambda_c/2n_2$, respectively, where $m_1$ and $m_2$ are positive integers and $n_1$ and $n_2$ are the real parts of refractive indices of materials in said first edge filter and said second edge filter, respectively.

66. Light filter apparatus having a band pass with a central wavelength for reflected light that varies continuously with displacement of position in a selected spatial direction in a light-receiving surface of a filter, the apparatus comprising:
a first edge filter that is approximately fully reflecting for incident light of wavelength equal to a selected central wavelength $\lambda_c$ and that is substantially non-reflecting for incident light having a wavelength $\lambda = \lambda_c + \Delta\lambda_1$ with $\Delta\lambda/\lambda_c > 0.1$;
a second edge filter that is approximately fully reflecting for incident light of wavelength $\lambda_c$ and that is substantially non-reflecting for incident light of wavelength $\lambda = \lambda_c - \Delta\lambda_2$ with $\Delta\lambda_2/\lambda_c > 0.1$, where the wavelength $\lambda_c$ increases monotonically with displacement of position in said selected spatial direction;

a band pass filter stratum, positioned adjacent to at least one of the first edge filter and the second edge filter, that is approximately fully reflecting for incident light of wavelength $\lambda_c$ and that is substantially non-reflecting for light of wavelength $\lambda = \lambda_c + \Delta\lambda_3$ with $|\Delta\lambda_3/\lambda_c| > 0.5$, where the first and second edge filters and the band pass filter stratum are positioned to serially receive and reflect a portion of an incident light beam.

67. The apparatus of claim 66, further comprising an array of photosensors extending in said selected direction, with each photosensor being positioned to receive a portion of a light beam that is reflected serially from said first and second edge filters and said band pass filter stratum at a position measured in said selected direction.

68. The apparatus of claim 62 or 66, wherein said band pass filter stratum has a wavelength pass band that does not vary substantially with displacement of said position in said selected direction.

69. The apparatus of claim 62 or 66, wherein said band pass filter stratum has two spaced apart, light-receiving surfaces that face each other and a distance of separation of these two surfaces increases monotonically with displacement of said position in said selected direction.

70. Light filter apparatus having a band pass with a central wavelength for light that varies with displacement of position in a selected spatial direction in a light-receiving surface of a filter, the apparatus comprising:

a multi-layer first filter that is at least partly transmitting for light having a wavelength $\lambda_c$, the filter having $N(N \geq 4)$ layers of material with relatively high refractive index $n_H$ and having $N-1$ layers of material with relatively low refractive index $n_L$, where the high index layers and the low index layers are positioned adjacent to and alternate with each other to form a multi-layer structure, where each high index layer has a thickness equal to $(2p-1)\lambda_c/4n_H$ for some positive integer p, each of the low index layers, except for two layers, has a thickness equal to $(2q-1)\lambda_c/4n_L$ for some positive integer q, and two of the low index layers have thicknesses that increase monotonically with displacement of position in the selected direction, and for at least one position the thicknesses of these two low index layers are approximately $m_1\lambda_c/2n_L$ and $m_2\lambda_c/2n_L$ for two positive integers $m_1$ and $m_2$, where $\lambda_c$ is a selected wavelength in the selected pass band; and a second filter that is at least partly transmitting for light having the wavelength $\lambda_c$, that is substantially fully absorbing or reflecting for light having a wavelength approximately equal to a wavelength of any side band of the first filter, and that is positioned so that light transmitted through one of the first filter and the second filter is received by the other filter.

71. Light filter apparatus having a band pass with a central wavelength for light that varies with displacement of position in a selected spatial direction in a light-receiving surface of a filter, the apparatus comprising:

a multi-layer first filter that is at least partly transmitting for light having a wavelength $\lambda_c$, the filter having $N(N \geq 4)$ layers of material with relatively high refractive index $n_H$ and having $N-1$ layers of material with relatively low refractive index $n_L$, where the high index layers and the low index layers are positioned adjacent to and alternate with each other to form a multi-layer structure, where each high index layer has a thickness equal to $(2q-1)\lambda_c/4n_H$ for some positive integer q, and two of the high index layers have thicknesses that increase monotonically with displacement of position in the selected direction, and for at least one position the thicknesses of these two high index layers are approximately $m_1\lambda_c/2n_H$ and $m_2\lambda_c/2n_H$ for two positive integers $m_1$ and $m_2$, where $\lambda_c$ is a selected wavelength in the selected pass band; and a second filter that is at least partly transmitting for light having the wavelength $\lambda_c$, that is substantially fully absorbing or reflecting for light having a wavelength approximately equal to a wavelength of any side band of the first filter, and that is positioned so that light transmitted through one of the first filter and the second filter is received by the other filter.

72. Light filter apparatus having a band pass with a central wavelength for light that varies with displacement of position in a selected spatial direction in a light-receiving surface of a filter, the apparatus comprising:

a multi-layer first filter that is at least partly transmitting for light having a wavelength $\lambda_c$, the filter having $N(N \geq 4)$ layers of material with relatively low refractive index $n_L$ and having $N-1$ layers of material with relatively high refractive index $n_H$, where the high index layers and the low index layers are positioned adjacent to and alternate with each other to form a multi-layer structure, where each high index layer has a thickness equal to $(2p-1)\lambda_c/4n_H$ for some positive integer p, each of the low index layers, except for two layers, has a thickness equal to $(2q-1)\lambda_c/4n_L$ for some positive integer q, and two of the low index layers have thicknesses that increase monotonically with displacement of position in the selected direction, and for at least one position the thicknesses of these two low index layers are approximately $m_1\lambda_c/2n_L$ and $m_2\lambda_c/2n_L$ for two positive integers $m_1$ and $m_2$, where $\lambda_c$ is a selected wavelength in the selected pass band; and a second filter that is at least partly transmitting for light having the wavelength $\lambda_c$, that is substantially fully absorbing or reflecting for light having a wavelength approximately equal to a wavelength of any side band of the first filter, and that is positioned so that light transmitted through one of the first filter and the second filter is received by the other filter.

73. Light filter apparatus having a band pass with a central wavelength for light that varies with displacement of position in a selected spatial direction in a light-receiving surface of a filter, the apparatus comprising:

a multi-layer first filter that is at least partly transmitting for light having a wavelength $\lambda_c$, the filter having $N(N \geq 4)$ layers of material with relatively low refractive index $n_L$ and having $N-1$ layers of material with relatively high refractive index $n_H$, where the high index layers and the low index layers are positioned adjacent to and alternate with each other to form a multi-layer structure, where each high index layer has a thickness equal to $(2p-1)\lambda_c/4n_H$ for some positive integer p, each of the high index layers, except for two layers, has a thickness equal to $(2q-1)\lambda_c/4n_H$ for some positive integer q, and two of the high index layers have thicknesses that increase monotonically with displacement of position in the selected direction, and for at least one position the thicknesses of these two high index layers are approximately $m_1\lambda_c/2n_H$ and $m_2\lambda_c/2n_H$ for two positive integers $m_1$ and $m_2$, where $\lambda_c$ is a selected wavelength in the selected pass band; and a second filter that is at least partly transmitting for light having the wavelength $\lambda_c$, that is substantially fully absorbing or reflecting for light having a wavelength approximately equal to a wavelength of any side band of the first filter, and that is positioned so that light transmitted through one of the first filter and the second filter is received by the other filter.

74. The apparatus of claim 70 or 72, wherein said second filter is substantially fully absorbing or reflecting for light having a wavelength $\lambda=\lambda_c+\Delta\lambda$ with $|\Delta\lambda|/\lambda_c>0.5$.

75. The apparatus of claim 71 or 73, wherein said second filter is substantially fully absorbing or transmitting for light having a wavelength $\lambda=\lambda_c+\Delta\lambda$ with $|\Delta\lambda|/\lambda_c>0.5$.

76. The apparatus of claim 70, 71, 72 or 73, wherein said second filter has two spaced apart light-receiving surfaces facing each other, with a distance of separation that increases monotonically with displacement of position in the selected direction.

77. A method of dispersing a light beam continuously into a plurality of wavelength intervals that form a continuous spectrum with wavelength increasing monotonically in a selected spatial direction, the method comprising the steps of:

providing a first stratum of filter material having two spaced apart, light-receiving surfaces facing each other, the first stratum being partly transmitting and partly reflecting for light received at a light-receiving surface thereof and having a wavelength in a selected pass band of wavelengths, where a distance of separation $h_1(x)$ of the two surfaces increases monotonically with displacement of position in the selected direction and for at least one selected position the distance of separation $h_1(x)$ is approximately equal to $m\lambda_c/2n$, where m is a positive integer and n is the real part of the refractive index of the material for light of a selected wavelength $\lambda_c$ in the selected pass band;

providing a second stratum of filter material, having two spaced, apart light-receiving surfaces facing each other with a distance of separation $h_2(x)$ that increases monotonically with displacement in the selected direction, that is at least partly transmitting for light having the wavelength $\lambda_c$, that is substantially fully absorbing or reflecting for light having a second wavelength approximately equal to a wavelength of any transmittance sideband of the first stratum of filter material, and that is positioned so that light transmitted through one of the first stratum and the second stratum is received by the other stratum; and directing a beam of light so that the beam illuminates at least a portion of the first stratum or the second stratum in the selected direction.

78. A method of dispersing a light beam continuously into a plurality of wavelength intervals that form a continuous spectrum with wavelength increasing monotonically in a selected spatial direction, the method comprising the steps of:

providing a first stratum of filter material having two spaced apart, light-receiving surfaces facing each other, the first stratum being partly transmitting and partly reflecting for light received at a light-receiving surface thereof and having a wavelength in a selected pass band of wavelengths, where a distance of separation $h_1(x)$ of the two surfaces increases monotonically with displacement of position in the selected direction and for at least one selected position the distance of separation $h_1(x)$ is approximately equal to $(2m-1)\lambda_c/4n$, where m is a positive integer and n is the real part of the refractive index of the material for light of a selected wavelength $\lambda_c$ in the selected pass band;

providing a second stratum of filter material, having two spaced, apart light-receiving surfaces facing each other, with a distance of separation $h_2(x)$ that increases monotonically with displacement in the selected direction, that is at least partly reflecting for light having the wavelength $\lambda_c$, that is substantially fully absorbing or transmitting for light having a second wavelength approximately equal to a wavelength of any reflectance sideband of the first stratum of filter material, and that is positioned so that light transmitted through one of the first stratum and the second stratum is received by the other stratum; and directing a beam of light so that the beam illuminates at least a portion of the first stratum or the second stratum in the selected direction.

79. A method of dispersing a light beam continuously into a plurality of wavelength intervals that form a continuous spectrum with wavelength increasing monotonically in a selected spatial direction, the method comprising the steps of:

providing a first stratum of filter material having two spaced apart, light-receiving surfaces facing each other, the first stratum being partly transmitting and partly reflecting for light received at a light-receiving surface thereof and having a wavelength in a selected pass band of wavelengths, where a distance of separation $h_1(x)$ of the two surfaces increases monotonically with displacement of position in the selected direction and for at least one selected position the distance of separation $h_1(x)$ is approximately equal to $m\lambda_c/2n$, where m is a positive integer and n is the real part of the refractive index of the material for light of a selected wavelength $\lambda_c$ in the selected pass band;

providing a second stratum of filter material, having two spaced, apart light-receiving surfaces facing each other with a distance of separation $h_2(x)$ that increases monotonically with displacement in the selected direction, that is at least partly transmitting for light having the wavelength $\lambda_c$, that is substantially fully absorbing or reflecting for light having a second wavelength approximately equal to a wavelength of any transmittance sideband of the first stratum of filter material, and that is positioned so that light transmitted through one of the first stratum and the second stratum is received by the other stratum; and directing a beam of light so that the beam illuminates at least a portion of the first stratum or the second stratum in the selected direction.

80. A method of dispersing a light beam continuously into a plurality of wavelength intervals that form a continuous spectrum with wavelength increasing monotonically in a selected spatial direction, the method comprising the steps of:

providing a first stratum of filter material having two spaced apart, light-receiving surfaces facing each other, the first stratum being partly transmitting and partly reflecting for light received at a light-receiving surface thereof and having a wavelength in a selected pass band of wavelengths, where a distance of separation $h_1(x)$ of the two surfaces increases monotonically with displacement of position in the selected direction and for at least one selected position the distance of separation $h_1(x)$ is approximately equal to $(2m-1)\lambda_c/4n$, where m is a positive integer and n is the real part of the refractive index of the material for light of a selected wavelength $\lambda_c$ in the selected pass band;

providing a second stratum of filter material, having two spaced, apart light-receiving surfaces facing each other with a distance of separation $h_2(x)$ that increases monotonically with displacement in the selected direction, that is at least partly transmitting for light having the wavelength $\lambda_c$, that is substantially fully absorbing or reflecting for light having a second wavelength approximately equal to a wavelength of any reflectance sideband of the first stratum of filter material, and that is positioned so that light transmitted through one of the first stratum and the second stratum is received by the other stratum; and directing a beam of light so that the beam illuminates at least a portion of the first stratum or the second stratum in the selected direction.

81. The method of claim 79 or 80, further comprising the step of:

providing said second stratum with said distance of separation $h_2(x)$ that, for said selected position in said selected direction, has a value approximately equal to $m'\lambda_c/2n'$, where $n'$ is the real part of the refractive index of said filter material of said second stratum, and $m'$ is a positive integer that is relatively prime to said positive integer m.

82. The method of claim 79 or 80, further comprising the step of:

providing said second stratum with said distance of separation $h_2(x)$ that, for said selected position in said selected direction, has a value approximately equal to $m'\lambda_c/2n'$, where $n'$ is the real part of the refractive index of said filter material of said second stratum, and $m'$ is a positive integer that is relatively prime to said positive integer m.

83. The method of claim 77, 78, 79 or 80, further comprising the steps of:

providing a substrate of material with a surface that is at least partly reflecting for light having a wavelength in said selected pass band; and positioning said first stratum and said second stratum adjacent to each other and adjacent to the substrate surface.

84. The method of claim 77, 78, 79 or 80, further comprising the steps of:

providing a substrate of material having fist and second opposed surfaces that are each at least partly reflecting and the material being at least partly transmitting, for light having a wavelength in said selected pass band; and positioning said first stratum and said second stratum on opposite sides of the substrate adjacent to the first and second opposed surfaces, respectively, of the substrate.

* * * * *

UNITED STATES PATENT AND TRADEMARK OFFICE
CERTIFICATE OF CORRECTION

PATENT NO. : 5,144,498
DATED : September 1, 1992
INVENTOR(S) : Kent D. Vincent

It is certified that error appears in the above-indentified patent and that said Letters Patent is hereby corrected as shown below:

Col. 33, 1. 7 -- delete "transmitting" and insert therefor --reflecting--

Col. 33, 1. 33 -- delete "material" and insert therefor --materials--

Col. 35, 1. 39 -- delete "transmitting" and insert therefor --reflecting--

Col. 35, 1. 41 -- delete "reflecting" and insert therefor --transmitting--

Col. 36, 1. 28 -- delete "transmitting" and insert therefor --reflecting--

Col. 36, 1. 33 -- after ";" insert --and--

Col. 36, 1. 37 -- delete "or second"

Col. 37, 1. 8 -- after "surfaces" insert --facing--

Col. 42, 1. 6 -- delete "high" and insert therefor --low--

Col. 42, 1. 7 -- delete "$(2q-1)\lambda_c/4n_H$" and insert therefor
    --$(2q-1)\lambda_c/4n_L$--

Col. 42, 1. 7 -- delete "q" and insert therefor --p--

Col. 42, 1. 67 -- delete "high" and insert therefor --low--

Col. 43, 1. 52 -- delete "spaced, apart" and insert therefor
    --spaced apart,--

UNITED STATES PATENT AND TRADEMARK OFFICE
CERTIFICATE OF CORRECTION

PATENT NO. : 5,144,498  
DATED : September 1, 1992  
INVENTOR(S) : Kent D. Vincent It is certified that error appears in the above-indentified patent and that said Letters Patent is hereby corrected as shown below:

Col. 43, l. 54 -- delete "spaced, aprart" and insert therefor  
--spaced apart,--

Col. 45, l. 22 -- delete "spaced, apart" and insert therefor  
--spaced  apart,--

Col. 46, l. 29 -- delete "fist" and insert therefor --first--

Signed and Sealed this

Twenty-second Day of October, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,144,498
DATED : September 1, 1992
INVENTOR(S) : Kent D. Vincent

It is certified that error appears in the above-identified patent and that said Letters Patent is hereby corrected as shown below:

Col. 42, l. 68, delete "$(2p-1)\lambda_c/4n_H$" and insert therefor --$(2p-1)\lambda_c/4n_L$--.

Col. 44, l. 57-58, delete "transmitting" and insert therefor --reflecting--.

Col. 44, l. 59 - delete "reflecting" and insert therefor --transmitting--.

Col. 45, l. 15, after "direction" insert a comma --,--.

Signed and Sealed this

Third Day of December, 1996

Attest:

BRUCE LEHMAN

*Attesting Officer*       *Commissioner of Patents and Trademarks*